United States Patent
Aburatani et al.

(10) Patent No.: US 9,196,925 B2
(45) Date of Patent: Nov. 24, 2015

(54) GLASS PARTICLES

(71) Applicants: Ryo Aburatani, Sodegaura (JP); Minoru Senga, Sodegaura (JP); Tadanori Junke, Sodegaura (JP); Masao Aida, Ichihara (JP)

(72) Inventors: Ryo Aburatani, Sodegaura (JP); Minoru Senga, Sodegaura (JP); Tadanori Junke, Sodegaura (JP); Masao Aida, Ichihara (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 65 days.

(21) Appl. No.: 14/345,809

(22) PCT Filed: Sep. 20, 2012

(86) PCT No.: PCT/JP2012/005992
§ 371 (c)(1),
(2) Date: Mar. 19, 2014

(87) PCT Pub. No.: WO2013/042371
PCT Pub. Date: Mar. 28, 2013

(65) Prior Publication Data
US 2014/0227610 A1     Aug. 14, 2014

(30) Foreign Application Priority Data

Sep. 22, 2011 (JP) ................. 2011-207408
Mar. 27, 2012 (JP) ................. 2012-071370
May 30, 2012 (JP) ................. 2012-122844

(51) Int. Cl.
| | |
|---|---|
| C03C 12/00 | (2006.01) |
| H01M 10/0562 | (2010.01) |
| H01M 10/0525 | (2010.01) |
| C03C 4/18 | (2006.01) |
| C03C 3/32 | (2006.01) |
| H01B 1/10 | (2006.01) |
| C03C 1/02 | (2006.01) |
| C03C 10/00 | (2006.01) |
| C01B 17/22 | (2006.01) |
| C01B 17/36 | (2006.01) |

(52) U.S. Cl.
CPC ........... *H01M 10/0562* (2013.01); *C01B 17/22* (2013.01); *C01B 17/36* (2013.01); *C03C 1/02* (2013.01); *C03C 3/321* (2013.01); *C03C 4/18* (2013.01); *C03C 10/00* (2013.01); *C03C 12/00* (2013.01); *H01B 1/10* (2013.01); *H01M 10/0525* (2013.01); *C01P 2004/61* (2013.01); *C01P 2006/12* (2013.01); *C01P 2006/14* (2013.01); *C01P 2006/80* (2013.01)

(58) Field of Classification Search
CPC ............ C03C 3/321; C03C 3/32; C03C 4/18; C03C 8/02; C03C 10/00; C03C 12/00; H01M 10/0562; H01M 10/0525; H01B 1/10
See application file for complete search history.

(56) References Cited

U.S. PATENT DOCUMENTS

| | | | |
|---|---|---|---|
| 2007/0160911 A1 | 7/2007 | Senga et al. | |
| 2012/0009484 A1 | 1/2012 | Aburatani et al. | |

FOREIGN PATENT DOCUMENTS

| | | |
|---|---|---|
| JP | 11-134937 | 5/1999 |
| JP | 2002-109955 | 4/2002 |
| JP | 2005-228570 | 8/2005 |
| JP | 2011-44249 | 3/2011 |
| JP | 2011-136899 A | 7/2011 |
| WO | WO 2010/116732 A1 | 10/2010 |

OTHER PUBLICATIONS

Extended European Search Report issued Apr. 7, 2015 in Patent Application No. 12832920.8.
Keiichi Minami, et al., "Structure and properties of $Li_2S$—$P_2S_5$—$P_2S_3$ glass and glass-ceramic electrolytes" Journal of Power Sources, vol. 189, No. 1, XP025982769, Apr. 1, 2009, pp. 651-654.
International Preliminary Report on Patentability issued Apr. 3, 2014 in PCT/JP2012/005992 filed on Sep. 20, 2012 (English translation).
Written Opinion issued Oct. 30, 2012 in PCT/JP2012/005992 filed on Sep. 20, 2012 (English translation).
International Search Report issued Oct. 30, 2012 in PCT/JP2012/005992 filed on Sep. 20, 2012.

*Primary Examiner* — Anthony J Green
*Assistant Examiner* — Elizabeth A Bolden
(74) *Attorney, Agent, or Firm* — Oblon, McClelland, Maier & Neustadt, L.L.P.

(57) ABSTRACT

Glass particles including Li, P and S, wherein when a Raman spectrum of the glass particles is measured five times or more and a peak at 330 to 450 $cm^{-1}$ in the Raman spectrum is separated into peaks of components by waveform separation, the standard deviation of the area ratio of each of the peaks of the components is 3.0 or less, the area of the peak of $PS_4^{3-}$ component obtained by the waveform separation is 10 to 95% of the total area, and the area of $P_2S_7^{4-}$ component obtained by the waveform separation is 5 to 45% of the total area, and the area of the peak of $PS_4^{3-}$ component is larger than the area of the peak of $P_2S_7^{4-}$ component.

16 Claims, 3 Drawing Sheets

GLASS PARTICLES

TECHNICAL FIELD

The invention relates to solid electrolyte glass particles used in a lithium ion battery or the like.

BACKGROUND ART

In recent years, a highly safe and high-capacity lithium ion battery has been actively developed.

Due to the liquid electrolyte, a lithium ion battery which has been practically used at present has a drawback that it is not safe. Therefore, an inorganic solid electrolyte has been developed (Patent Document 1).

All-solid lithium battery using an inorganic solid electrolyte in Patent Document 1 is highly safe. However, since it is produced by subjecting lithium sulfate and phosphorous pentasulfide to mechanical milling, the surface is not uniform, and hence, the battery performance may be deteriorated.

The uniformity of the electrolyte surface is an important property in stabilizing the performance of a battery as a final product. Since the electrolyte surface is a medium on which lithium ions move directly, if the uniformity thereof is poor, resistance partially increases, and as a result, stable battery performance is not developed. Further, in order to allow it to be glass ceramic, if the electrolyte surface is not uniform, crystals that are favorable for attaining excellent conductivity are not formed partially. As a result, when used in a battery, such an un-uniform surface of an electrolyte may lower the battery performance.

RELATED ART DOCUMENTS

Patent Document

Patent Document 1: JP-A-H11-134937

SUMMARY OF THE INVENTION

A first object of the invention is to obtain glass particles having uniform surfaces and are capable of suppressing a partial increase in resistance.

A second object of the invention is to shorten the production time of a solid electrolyte.

A third object of the invention is to provide a method for producing an ionic conductive substance which can be produced for a short period of time and spends only a small amount of energy in production.

The above-mentioned first to third objects respectively correspond to the following first to third inventions.

According to the first invention, the following glass particles are provided.
1. Glass particles comprising Li, P and S, wherein when a Raman spectrum of the glass particles is measured five times or more and a peak at 330 to 450 cm$^{-1}$ in the Raman spectrum is separated into peaks of components by waveform separation, the standard deviation of the area ratio of each of the peaks of the components is 3.0 or less, the area of the peak of $PS_4^{3-}$ component obtained by the waveform separation is 10 to 95% of the total area, and the area of $P_2S_7^{4-}$ component obtained by the waveform separation is 5 to 45% of the total area, and the area of the peak of $PS_4^{3-}$ component is larger than the area of the peak of $P_2S_7^{4-}$ component.
2. The glass particles according to 1, wherein the standard deviation is 2.7 or less, the area of the peak of $PS_4^{3-}$ component is 70 to 90% of the total area and the area of $P_2S_7^{4-}$ component is 5 to 20% of the total area.
3. The glass particles according to 1 or 2 having an average particle diameter of 10 μm or less.
4. The glass particles according to any of 1 to 3 which are produced by using lithium sulfide having a specific surface area of 0.1 m$^2$/g or more and a pore volume of 0.02 ml/g or more.

According to the second invention, the following method for producing a solid electrolyte is provided.
1. A method for producing a solid electrolyte wherein a slurry comprising a raw material comprising alkali metal sulfide particles and a solvent is circulated between a pulverizer that synthesizes a solid electrolyte by reacting the raw material while pulverizing and a temperature-retaining apparatus that retains the slurry at 40° C. to 300° C., wherein the alkali metal sulfide particles have a specific surface area measured by the BET method of 10.0 m$^2$/g or more.
2. A method for producing a solid electrolyte wherein a slurry comprising a raw material comprising alkali metal sulfide particles and a solvent is circulated between a pulverizing means that synthesizes a solid electrolyte by reacting the raw material while pulverizing and a temperature-retaining means that retains the slurry at 40° C. to 300° C., wherein the alkali metal sulfide particles have a specific surface area measured by the BET method of 10.0 m$^2$/g or more.
3. The method for producing a solid electrolyte according to 1 or 2, wherein the alkali metal sulfide particles have a diameter of 100 μm or less.
4. The method for producing a solid electrolyte according to any of 1 to 3, wherein the alkali metal sulfide particles are lithium sulfide particles and the raw material further comprise one or more compounds selected from phosphor sulfide, germanium sulfide, silicon sulfide and boron sulfide.

According to the third invention, the following method for producing an ionic conductive substance or the like is provided.
1. A method for producing an ionic conductive substance comprising:
a first process in which one or more compounds selected from phosphor sulfide, germanium sulfide, silicon sulfide and boron sulfide are brought into contact with an alkali metal sulfide compound or an alkaline earth metal sulfide in a solvent with stirring, and a second process in which a product produced in the first process is subjected to a mechanical treatment.
2. The method for producing an ionic conductive substance according to 1, wherein the mechanical treatment in the second process is conducted in a solvent.
3. The method for producing an ionic conductive substance according to 1 or 2, which further comprises a third process in which the product that has been subjected to a mechanical treatment in the second process is stirred in a solvent, and the second process and the third process are alternately repeated.
4. The method for producing an ionic conductive substance according to any of 1 to 3, wherein the alkali metal sulfide compound or the alkaline earth metal sulfide is lithium sulfide.
5. The method for producing an ionic conductive substance according to any of 1 to 4, wherein the one or more compounds selected from phosphor sulfide, germanium sulfide, silicon sulfide and boron sulfide is phosphor sulfide.

According to the first invention, glass particles having uniform surfaces and are capable of suppressing a partial increase in resistance can be provided.

According to the second invention, the production time of solid electrolyte can be shortened.

According to the third invention, a method for producing an ionic conductive substance which can be produced for a short period of time and spends only a small amount of energy in production can be provided.

MODE FOR CARRYING OUT THE INVENTION

First Invention

The glass particles of the invention comprise each of Li, P and S elements. For each sample, a Raman spectrum is measured five or more times. A peak at 330 to 450 cm$^{-1}$ in the Raman spectrum is separated into peaks of components by waveform separation, and the standard deviation of the area ratio of each component is 3.0 or less. The peak surface area of the $PS_4^{3-}$ component obtained by the waveform separation is 10 to 95% of the total area. The peak surface area of the $P_2S_7^{4-}$ component is 5 to 45% of the total area. That is, the peak area of the $PS_4^{3-}$ component is larger than the peak area of the $P_2S_7^{4-}$ component.

The Raman spectrum is used to grasp the state of a solid, powder or the like. By grasping the properties of the spectrum, the property of a solid material is specified (see JP-A-2005-336000, JP-A-H10-326611 and JP-A-2001-19450).

The Raman spectrum is suited to analyze the surface state of a solid. When the particles in the same lot are measured, if the composition on the particle surfaces is not uniform, a different spectrum is obtained.

For example, when a solid material is subjected to mechanical milling, if a fully pulverized part and an insufficiently pulverized part (e.g. in which the material is adhered to the wall) are mixed, the spectrum varies due to deteriorated uniformity of the particles. As a result, if the measurement is repeated, reproducibility of the spectrum is lowered. Therefore, by taking the spectrum of the uniform material as the standard and by comparing the spectrum of measured particles with the standard, the surface state of the measured particles can be evaluated. In the invention, with the reproducibility of the spectrum (variance, in particular) being taken as an index, the surface state of the particles is evaluated.

Figure 1:
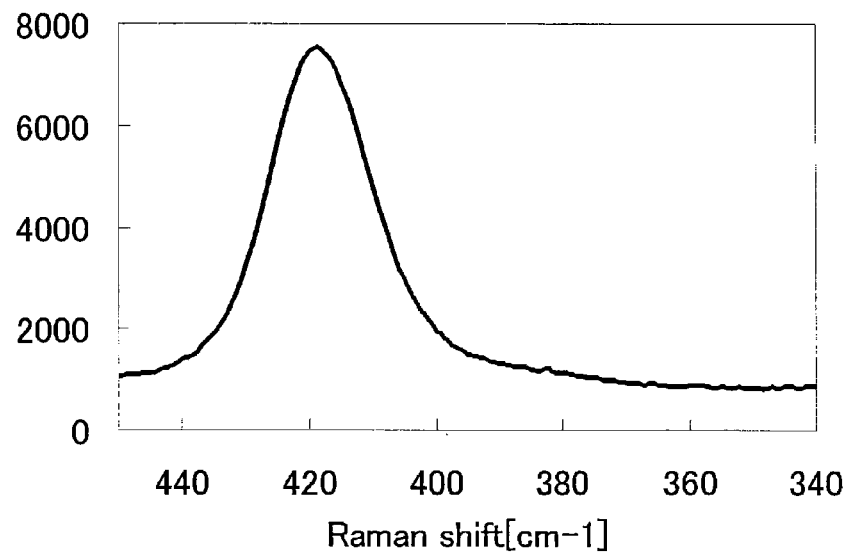
FIG. 1 is a Raman spectrum of glass particles prepared in Example 1-1 of the first invention.

FIG. 1 shows an example of the Raman spectrum of the glass particles of the invention.

In the glass particles of the invention, a characteristic peak is detected around 400 cm$^{-1}$. Due to its asymmetric shape, this peak is a mixed peak of a plurality of components. This peak is confirmed to be a mixed peak of three components of $PS_4^{3-}$, $P_2S_7^{4-}$ and $P_2S_6^{4-}$ (M. Tachez, J.-P. Malugani, R. Mercier, and G. Robert, Solid State Ionics, 14, 181 (1984)).

It is desired that the above-mentioned peaks are detected according to the component by using an apparatus having a high resolution power. However, it is possible to separate into individual peaks by using a common or apparatus-dedicated waveform analysis software. As the waveform analysis software, GRAMS AI manufactured by Thermo SCIENTIFIC can be used, for example.

Figure 2:
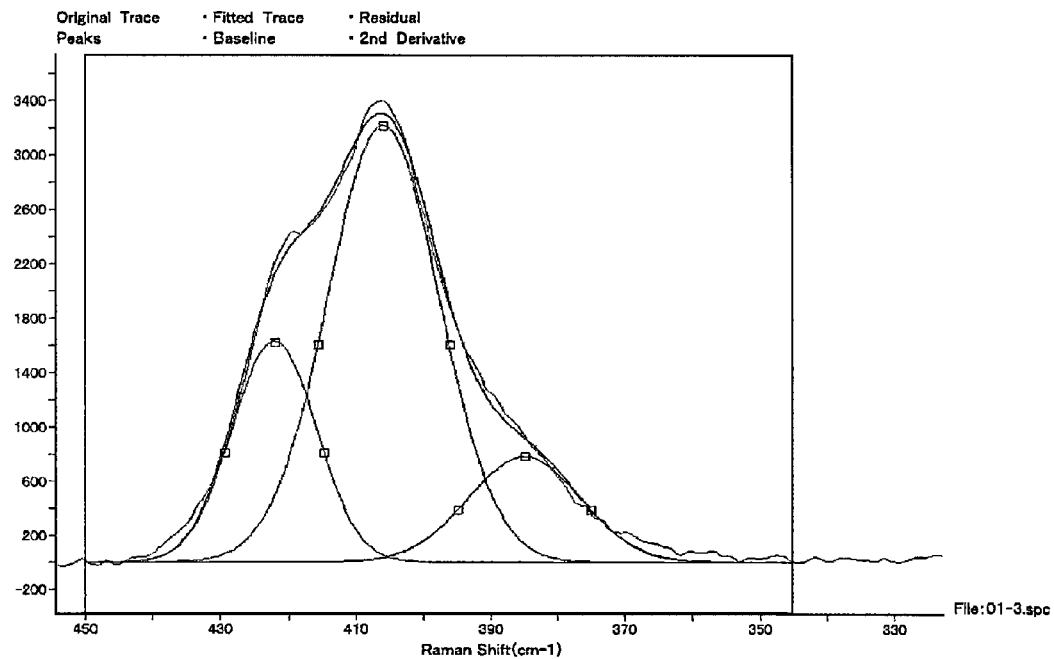
FIG. 2 is a spectrum obtained by separating a Raman spectrum of glass particles prepared in Comparative Examples 1-1 of the first invention.

FIG. 2 shows an example in which the peaks are separated into individual peaks by using a waveform analysis software. From the peak separated, the area of each component can be obtained.

The standard deviation can be calculated from the above-mentioned area by using a common calculation method. It is desirable to conduct calculation five or more times (five or more locations) for one object to be measured (an aggregate of particles). It does not mean the same location of one object to be measured is measured repeatedly, but means different locations of the object to be measured is measured five or more times.

If the standard deviation of the area ratio of each component ($PS_4^{3-}$, $P_2S_7^{4-}$ and $P_2S_6^{4-}$) is 3.0 or less, the surface of each glass particle is uniform, and when used in a battery, the battery performance is stabilized. Each of the above-mentioned standard deviations is preferably 2.7 or less, more preferably 2.5 or less, with 2.0 or less being particularly preferable. Although no specific restrictions are imposed on the lower limit, the lower limit is normally 0.1 or more.

The molar ratio of each element, i.e. Li, P and S, of glass particles can be adjusted by the elemental ratio of the raw material. The elemental ratio of the raw material is almost coincident with the elemental ratio of the glass.

The glass particles of the invention may comprise only Li, P and S as mentioned above, and, in addition to these elements, a substance including Al, B, Si, Ge or the like may be contained. Such a substance may be contained in an amount of 1.0% or less, for example.

In the invention, the area of the peak of the $PS_4^{3-}$ component obtained by waveform separation is 10 to 95% of the total area, the area of the peak of the $P_2S_7^{4-}$ component is 5 to 45% of the total area, and the area of the peak of the $PS_4^{3-}$ component is larger than the peak of the $P_2S_7^{4-}$ component. As a result, a stable electrolyte can be obtained. It is preferred that the area of the peak of the $PS_4^{3-}$ component be 70 to 90% of the total area. For example, it is 75 to 85%. The area of the peak of the $P_2S_7^{4-}$ component is 5 to 20% of the entire area. For example, the area is 7 to 15%.

If the conditions of the peak are outside the above-mentioned range, the uniformity of the invention cannot be obtained especially in a region having a large amount of the $P_2S_7^{4-}$ component. JP-A-2010-250981 states that, in the mechanical milling method, a uniform electrolyte cannot be obtained easily by simply prolonging the milling time. In contrast, under the above-mentioned peak conditions, a uniform electrolyte can be obtained in the mechanical milling method by conducting milling for a sufficiently long period of time.

It is preferred that the glass particles be produced from $Li_2S$ and $P_2S_5$. As for the amount ratio (mol %), $Li_2S:P_2S_5$ is preferably 72 to 82:28 to 18, more preferably 72 to 80:28 to 20, with 73 to 78:27 to 22 being further preferable.

The average particle size of the glass particles is preferably 10 μm or less. More preferably, 0.10 μm or more and 8 μm or less. Further preferably, 0.15 μm or more and 7 μm or less.

The average particle size means the average value of the major axes of a plurality of glass particles which have been arbitrary selected by observing the glass particles by a scanning electron microscope (SEM).

The amount of the organic solvent (used in production) remained in the glass particles of the invention is preferably 5.0 wt % or less, more preferably 3.0 wt % or less.

The glass particles of the invention can be produced by using a raw material comprising an organic compound, an inorganic compound or both of an organic compound and an inorganic compound.

It is preferred that the glass particles of the invention be produced from lithium sulfate ($Li_2S$) and phosphorus pentasulfide ($P_2S_5$) as the raw material.

As the lithium sulfide, commercially-available high-purity lithium sulfide can be used. The purity is preferably 95% or more.

The purity of lithium sulfate can be measured by titration.

The specific surface area of lithium sulfide is preferably 0.1 $m^2/g$ or more, more preferably 1.0 $m^2/g$ or more. The upper limit is not particularly restricted, but normally 200 $m^2/g$ or less.

The pore volume of lithium sulfide is preferably 0.02 ml/g or more, more preferably 0.05 ml/g or more. The upper limit is not particularly restricted, but normally 5 ml/g or less.

The surface area and pore volume of lithium sulfide are values measured by the BET method using nitrogen.

The lithium sulfide as mentioned above can be produced by the following method, for example. A hydrogen sulfide gas is blown to a slurry comprising lithium hydroxide and a hydrocarbon-based organic solvent, thereby allowing the lithium hydroxide and the hydrogen sulfide to react. The reaction is continued while removing the water generated by the reaction from the slurry, and after the reaction system has become substantially empty of the water content, blowing of the hydrogen sulfide is stopped, and then an inert gas is blown (see JP-A-2010-163356).

No specific restrictions are imposed on the phosphorus pentasulfide, as long as it is commercially produced and sold. Instead of $P_2S_5$, phosphor (P) as a simple substance and sulfur (S) as a simple substance can be used with a corresponding molar ratio.

The glass particles of the invention can be produced by subjecting a specific amount of the above-mentioned raw material to mechanical milling (MM) for a sufficiently long period of time.

As the apparatus to be used in the mechanical milling, a planetary ball mill or the like can be given. As the ball, a zirconia ball can be used. It is preferred that the ball be in the form of a sphere having a diameter of 10 mm or more and 30 mm or less.

An alumina-made pot can be used, and the size thereof is preferably 5 L or more and 10 L or less.

The amount of the raw material to be put in a ball mill is preferably 20 vol % to 50 vol % relative to the amount of balls placed in the ball mill. The number of rotations at the time of the treatment is preferably 100 rpm or more and 500 rpm or less, and the rotation time is preferably 100 hours or more and 480 hours or less.

The glass particles of the invention can be obtained by mixing the pulverized raw material in a solvent to obtain a slurry, and conducting a reaction while pulverizing the raw material in the slurry (hereinafter referred to as the "slurry method").

For example, it can be obtained by allowing the slurry containing the raw material that contains lithium sulfide and a solvent to circulate between a pulverizing machine that synthesizes a solid electrolyte by allowing the raw material to react while pulverizing the raw material and a temperature-retaining apparatus that retains the slurry at 40° C. to 300° C.

It is preferred that the lithium sulfide used as the raw material have a specific surface area measured by the BET method of 10.0 $m^2/g$ or more. It is preferable to use lithium sulfide as the raw material after finely pulverizing (hereinafter, referred to as modification).

The above-mentioned slurry method and the modification method are as explained in the second invention, given later.

Second Invention

The method for producing a solid electrolyte of the invention is a method wherein a slurry containing the raw material that contains alkali metal sulfide particles and a solvent is circulated between a pulverizing machine that synthesizes a solid electrolyte by allowing the raw material to react while pulverizing the raw material and a temperature-retaining apparatus that retains the slurry at 40° C. to 300° C. (slurry method). In the invention, as the alkali metal sulfide particles, one having a specific surface area measured by the BET method of 10.0 $m^2/g$ or more is used.

According to the method of the invention, the time required for the production of a solid electrolyte can be shortened. Even in the case where the molar ratio of lithium sulfide in the raw material exceeds 70 mol %, the production time can be shortened.

Further, even if the molar ratio of lithium sulfide exceeds 75 mol %, the amount of remaining lithium sulfide as the raw material is very small or almost zero.

As the method for producing a sulfide-based solid electrolyte, a method of producing an electrolyte by a heating/melting method at a high temperature (WO2005/119706), a method in which a solid electrolyte is produced by the milling method while conducting pulverization (JP-A-H11-134937) or the like can be mentioned.

However, the production method disclosed in WO2005/119706 has a defect that it requires a special equipment since production is conducted at high temperatures, and a large amount of energy is required during production.

In the production method disclosed in JP-A-11-134937, since a milling machine is required and used, energy is required.

As the method for producing a solid electrolyte, the raw material is circulated between a pulverization/synthesis means that synthesizes a solid electrolyte by allowing the raw material to react in a hydrocarbon-based solvent while pulverizing and a synthesis means that synthesizes a solid electrolyte by allowing the raw material to react in a hydrocarbon-based solvent is disclosed (JP-A-2010-140893).

However, the manufacturing method disclosed in JP-A-2010-140893 has a defect that the production of a solid electrolyte takes time. In particular, in a region where the molar ratio of lithium sulfide in the raw material exceeds 70 mol %, a solid electrolyte having a high ionic conductivity cannot be obtained when the reaction time is insufficient.

In the invention, first, a slurry is prepared by mixing a raw material that contains alkali metal sulfide particles and a solvent.

The alkali metal sulfide particles used as the raw material have a specific surface area measured by the BET method of 10.0 $m^2/g$ or more. Due to such a specific surface area, the production time of a solid electrolyte can be shortened. The specific surface area is preferably 12.0 $m^2/g$ or more, more preferably 17.0 $m^2/g$ or more, further preferably 25.0 $m^2/g$ or more, further preferably 31.0 $m^2/g$ or more, with 35 $m^2/g$ or more being most preferable.

The upper limit of the specific surface area is not particularly restricted, but normally 200 $m^2/g$ or less.

The particle size of alkali metal sulfide particles used as the raw material is preferably 100 µm or less, more preferably 80 µm or less, and further preferably 50 µm or less.

The particle size of alkali metal sulfide particles was measured by means of Mastersizer 200 (manufactured by MALVERN Instruments Ltd.) by the laser diffraction method and calculated from the volume average particle size. It is desired that this measurement be conducted directly in the slurry state without passing through the dried state. The reason therefor is that, once drying is conducted, particles are aggregated at the time of drying, whereby the apparent particle size may become large.

Further, it is preferred that the alkali metal sulfide particles used as the raw material have a pore volume of 0.01 ml/g or more. If the alkali metal sulfide particles have a pore volume of 0.01 ml/g or more, they can be reacted easily with the raw materials other than the alkali metal sulfide particles. At the same time, the alkali metal sulfide particles can be pulverized easily, whereby the reaction can proceed more easily.

The pore volume of the alkali metal sulfide particles is more preferably 0.1 ml/g or more, further preferably 0.2 ml/g or more.

The upper limit of the pore volume is not particularly restricted, but normally, it is 5 ml/g or less.

It is preferred that the alkali metal sulfide particles used as the raw material be lithium sulfide ($Li_2S$) particles.

Further, the particles may contain one or more compounds selected from phosphor sulfide, germanium sulfide, silicon sulfide and boron sulfide as the raw material. Of these, phosphor sulfide is preferable. The kind of the sulfide is not particularly limited, and those commercially available can be used. Preferred are one or more compounds selected from lithium sulfide and one or more compounds selected from phosphor sulfide, germanium sulfide, silicon sulfide and boron sulfide. Lithium sulfide and phosphor sulfide are more preferable.

(i) Method for Producing Lithium Sulfide

For example, lithium sulfide can be prepared by the methods described JP-A-H07-330312, JP-A-H09-283156, JP-A-2010-163356 and JP-A-2011-84438.

Specifically, lithium hydroxide and hydrogen sulfide are reacted in a nonprotonic organic solvent to produce lithium hydrogen sulfide. Then, this reaction liquid is hydrodesulfurized to form lithium sulfide (JP-A-H07-330312).

Further, by reacting lithium sulfide and gaseous sulfur source at a temperature of 130° C. or more and 445° C. or less, lithium sulfide can be synthesized (JP-A-H09-283156).

Further, lithium sulfide ($Li_2S$) as the raw material can be synthesized by reacting, in an organic solvent, lithium hydroxide and hydrogen sulfide, for example. Specifically, a hydrogen sulfide gas is blown to a slurry comprising lithium hydroxide and an organic solvent, thereby to react lithium hydroxide and hydrogen sulfide. At this time, the reaction continues while removing water generated by this reaction from the slurry. When the water in the system is substantially removed, lithium sulfide is produced by stopping blowing of the hydrogen sulfide and by starting blowing of an inert gas (JP-A-2010-163356).

The organic solvent used in this method is not particularly limited, a solvent which forms an azeotropic composition with water is preferable. The organic solvent may be used singly or in a combination of two or more. Specifically, a hydrocarbon-based organic solvent can be given. One selected from benzene (boiling point: 80° C.), toluene (boiling point: 111° C.), xylene (boiling point: p-body, 138° C., m-body, 139° C., o-body, 144° C.), ethylbenzene (boiling point: 136° C.) and dodecane (boiling point: 215° C.) or a mixture thereof can be preferably used.

Further, lithium hydroxide and hydrogen sulfide are reacted in an aqueous solvent at a temperature of 10° C. to 100° C. to form lithium hydrogen sulfide. Then, the reaction liquid is hydrodesulfurized, whereby lithium sulfide can be synthesized (JP-A-2011-84438).

(ii) Purity of Lithium Sulfide

As for lithium sulfide, the total content of a lithium salt of a sulfur oxide is preferably 0.15 mass % or less, more preferably 0.1 mass % or less and the content of lithium N-methylaminobutyrate is preferably 0.15 mass % or less, more preferably 0.1 mass % or less. If the total content of a lithium salt of a sulfur oxide is 0.15 mass % or less, a solid electrolyte obtained by melt quenching or mechanical milling becomes a glass-like electrolyte (completely amorphous). On the other hand, if the total content of a lithium salt of a sulfur oxide exceeds 0.15 mass %, the resulting electrolyte may be a crystallized product from the beginning, and this crystallized product has a low ionic conductivity. Further, this crystallized product does not change even if it is subjected to a heat treatment, and a sulfide-based solid electrolyte having a high ionic conductivity may not be obtained.

If the content of lithium N-methylaminobutyrate is 0.15 mass % or less, a deteriorated product of lithium N-methylaminobutyrate does not lower the cycle performance of a lithium ion battery. If lithium sulfide having a reduced amount of impurities, an electrolyte having a high ionic conductivity can be obtained.

(iii) Method for Purifying Lithium Sulfide

It is preferred that lithium sulfide produced by the method described in JP-A-H07-330312 and JP-A-H09-283156 be purified since it contains a lithium salt of a sulfur oxide or the like.

On the other hand, lithium sulfide produced by the method for producing lithium sulfide disclosed in JP-A-2010-163356 has a very small amount of a lithium salt of a sulfur oxide or the like, and hence, it may be used for the production of a sulfide-based solid electrolyte without being subjected to purification.

As the preferable method for purification, a purification method disclosed in WO2005/40039 or the like can be given. Specifically, lithium sulfide obtained as mentioned above is washed at a temperature of 100° C. or more by using an organic solvent.

In order to increase the specific surface area and/or the pore volume of the lithium sulfide prepared as mentioned above, for example, lithium sulfide is modified (pulverized). Alternatively, a physical technique using a mill or the like or a technique in which a polar solvent having a solubility parameter of 9.0 or more is added to lithium sulfide can be given.

If a physical method using a milling apparatus is used in order to increase the specific surface area of lithium sulfide, it can be conducted by a dry method or by a wet method.

In the case of a dry method, a ball mill, a planetary ball mill, a tumbling mill, a jet mill or the like can be used. In the case of a wet method, a non-aqueous solvent can be used as a solvent. As the non-aqueous solvent, hexane, heptane, octane, toluene, xylene, ethylbenzene, cyclohexane, methylcyclohexane, petroleum ether or the like can be given. The same milling apparatus as that used in the dry method can be used.

A technology in which a slurry solution of lithium sulfide is prepared and the resulting slurry solution is supplied to or circulated in a milling apparatus is also possible.

When a technology in which a polar solvent having one or more polar groups is added to lithium sulfide in order to increase the specific surface area of lithium sulfide is used, the following method can be implemented.

The polar solvent (modifier) having a solubility parameter of 9.0 or more is preferably a solvent having one or more polar groups selected from a hydroxyl group, a carboxy group, a nitrile group, an amino group, an amide bond, a nitro group, a —C(=S)-bond, an ether (—O—) bond, a —Si—O-bond, a ketone (—C(=O)—) bond, an ester (—C(=O)—O—) bond, a carbonate (—O—C(=O)—O—) bond, a —S(=O)-bond, chloro, and fluoro.

As the polar solvent containing one polar group, methanol (14.5) (numbers in parentheses indicate the solubility parameter), ethanol (12.7), n-propanol, isopropanol (11.5), n-butanol, isobutanol, n-pentanol, water (23.4), ethylene glycol (14.2), formic acid (13.5), acetic acid (12.6), acetonitrile (11.9), propionitrile, malononitrile, succinonitrile, fumaronitrile, trimethylsilyl=cyanide, N-methylpyrrolidone, triethylamine, pyridine, dimethylformamide (12.0), dimethylacetamide, nitromethane, carbon disulfide, diethyl ether, diisopropyl ether, t-butyl methyl ether, phenyl methyl ether, dimethoxy methane, diethoxy ethane, tetrahydrofuran, dioxane, trimethylmethoxysilane, dimethyldimethoxysilane, tetramethoxysilane, tetraethoxysilane, cyclohexylmethyldimethoxysilane, acetone (10.0), methyl ethyl ketone, acetoaldehyde, ethyl acetate (9.0), acetic anhydride, methylene carbonate, propylene carbonate, dimethylsulfoxide, methylene chloride, chloroform, dichloroethane, dichlorobenzene, hexafluorobenzene, trifluorobenzene or the like can be given.

As the polar solvent containing two types of the polar group, 2,2,2-trifluoroethanol, hexafluoroisopropanol, 2-aminoethanol, chloroacetic acid, trifluoroacetic acid, methoxypropionitrile, 3-ethoxypropionitrile, methyl cyanoacetae, difluoroacetonitrile or the like can be given.

The solvent may include a solvent having a solubility parameter of less than 9.0. As a solvent having a solubility parameter of less than 9.0, hexane (7.3), heptane, octane, decane, cyclohexane, ethylcyclohexane, methylcyclohexane, toluene (8.8), xylene (8.8), ethylbenzene, Ipsol 100 (manufactured by Idemitsu Kosan Co., Ltd.), Ipsol 150 (manufactured by Idemitsu Kosan Co., Ltd), IP solvent (manufactured by Idemitsu Kosan Co., Ltd), fluid paraffin, petroleum ether or the like can be given.

The above-mentioned solvent having a solubility parameter of 9.0 or more and the solvent having a solubility parameter of less than 9.0 are not required to be dehydrated. However, depending on the amount of water, water may adversely affect the amount of an alkali metal hydroxide generated as a by-product in a pulverized product. Therefore, the amount of water is preferably 50 ppm or less, more preferably 30 ppm or less.

The concentration in the total solvent of a polar solvent having a solubility parameter of 9.0 or more (the total solvent means one obtained by mixing a polar solvent having a solubility parameter of 9.0 or more and a solvent having a solubility of less than 9.0) is preferably 0.1 wt % or more and 100 wt % or less, more preferably 0.2 wt % or more, with 0.5 wt % or more being most preferable. A larger solubility parameter leads to greater modification effects. Therefore, the amount thereof may be small. On the contrary, if the solubility parameter is close to 9, modification effects are small. Accordingly, it is required to increase the amount added to prolong the modification time.

The boiling point of a polar solvent having a solubility parameter of 9.0 or more is preferably 40° C. to 300° C., more preferably 45° C. to 280° C. under normal pressure. This temperature range is preferable in respect of easiness in drying when a solvent is removed under heating in vacuum.

When modification is conducted, the amount of lithium sulfide is 0.5 parts by volume to 100 parts by volume, preferably 1 part by volume to 100 parts by volume, more preferably 1 part by volume to 50 parts by volume relative to 100 parts by volume of the total solvent (the total solvent means one obtained by mixing a polar solvent having a solubility parameter of 9.0 or more and a solvent having a solubility of less than 9.0).

The modification temperature varies according to the boiling point and the solidification point of a solvent used. Preferably, it is −100° C. or more and 100° C. or less, more preferably −80° C. or more and 80° C. or less. A desirable effect may not be obtained by a modification treatment at high temperatures.

The modification time is preferably 5 minutes to 1 week, with 1 hour to 5 days being more preferable.

The modification treatment may be conducted either in the continuous phase or the batch phase.

In the case of a batch reaction, a common blade can be used for stirring. Preferable blades include an Anchor blade, a Pfaudler blade, a helical blade, and a max blend blade. On the laboratory scale, stirring by means of a stirrer is commonly used. In the batch reaction, a reaction tank using a ball mill is also usable.

After the modification treatment is completed, the solvent is removed according to need. A polar solvent having a solubility parameter of 9.0 or more is removed by heating in the vacuum or by substitution with a non-polar solvent, for example. By the substitution by the non-polar solvent, the solvent can be replaced to a solvent having a solubility parameter of less than 9.0, for example. If the processes after the modification require the slurry state, it can be stored in the slurry state after this solvent substitution is conducted.

The modified pulverized product is subjected to a drying treatment if need arises in order to remove a remaining solvent. The drying treatment is preferably conducted in a nitrogen atmosphere or in vacuum. The drying temperature is preferably from room temperature to 300° C.

Depending on the type of a modification agent, an alkali metal hydroxide may be formed as a by-product. This hydroxide can be re-converted into a sulfide by introducing a hydrogen sulfide gas to the slurry solution of a pulverized product. This blowing of hydrogen sulfide can be conducted in a non-aqueous-based solvent.

Modification (pulverization) of lithium sulfide can also be conducted by using a polar solvent having a carbonate bond having a solubility parameter of 8.5 or more instead of a polar solvent having a solubility parameter of 9.0 or more.

As the polar solvent with a carbonate bond having a solubility parameter of 8.5 or more, in addition to those mentioned above, diethyl carbonate is included.

In the method for producing a solid electrolyte of the invention, as the solvent for the slurry, a non-protonic organic solvent (for example, a hydrocarbon-based organic solvent), a non-protonic polar organic solvent (for example, an amide compound, a lactam compound, a urea compound, an organic sulfur compound, a cyclic organic phosphor compound, or the like) can be preferably used as a single solvent or a mixed solvent.

The hydrocarbon-based solvent is saturated hydrocarbon, unsaturated hydrocarbon, aromatic hydrocarbon or the like.

As the saturated hydrocarbon, hexane, pentane, 2-ethylhexane, heptane, decane, cyclohexane or the like can be given.

As the unsaturated hydrocarbon, hexene, heptane, cyclohexene or the like can be given.

As the aromatic hydrocarbon, toluene, xylene, decaline, 1,2,3,4-tetrahydronaphthalene or the like can be given.

Of these, toluene and xylene are particularly preferable.

The amount of water in the solvent is preferably 50 ppm (by weight) or less in respect of the reaction of the raw material sulfide and the synthesized sulfide-based solid electrolyte. The water causes the sulfide-based solid electrolyte to be de-natured, thereby deteriorating the performance of a solid electrolyte. Therefore, the amount of water is preferably as small as possible, more preferably 30 ppm or less, and further preferably 20 ppm or less.

In the invention, a reaction is conducted in the state where a solvent is added to the above-mentioned raw material (for example, including lithium sulfide and other sulfides). By conducting a reaction in the state where a solvent is added, granulation at the time of processing can be suppressed, whereby a synthesis reaction can be promoted efficiently. As a result, a solid electrolyte having excellent uniformity and has a low content of an unreacted raw material can be obtained. Further, adhesion of the raw material or the unreacted substance to the wall of an apparatus can be prevented, whereby the yield of a product can be improved.

The amount of lithium sulfide charged at the time of the reaction is preferably 30 mol % to 95 mol % relative to the total of lithium sulfide and other sulfides. The amount is further preferably 60 mol % to 85 mol %, with 68 mol % to 80 mol % being particularly preferable. By adjusting the raw material amount ratio appropriately, a solid electrolyte having a high ionic conductivity can be produced.

The amount of the solvent is added preferably in an amount that allows the lithium sulfide and other sulfides as the raw material to be a solution or a slurry. Normally, the amount of the raw material added (total amount) relative to 1 kg of the solvent is about 0.03 to 1 kg. The amount is preferably 0.05 to 0.5 kg, with 0.1 to 0.3 kg being particularly preferable.

According to the production method of the invention, the resulting slurry is circulated between a pulverizer (pulverizing means) that synthesizes a solid electrolyte while pulverizing the raw material and the temperature-retaining apparatus (temperature-retaining means) that retains the slurry at 40° C. to 300° C.

As the pulverizer (pulverizing means), a roll mill (a tumbling mill), a swing mill, a vibration mill and a beads mill can be given. Of them, a beads mill is preferable.

If the pulverizer includes a ball, in order to prevent mixing in of foreign matters to a solid electrolyte due to the wear of the ball and the container, it is preferred that the ball be made of zirconium, reinforced aluminum or alumina.

The pulverization temperature by a pulverizer is preferably 20° C. or more and 80° C. or less, more preferably 20° C. or more and 60° C. or less. If the temperature of the treatment by means of a pulverizer is less than 20° C., the effects of reducing the reaction time are small. If the temperature of the treatment by means of a pulverizer exceeds 80° C., lowering in strength of zirconia, reinforced alumina and alumina becomes significant, and as a result, wear or deterioration of a container or a ball or contamination of a solid electrolyte may occur.

As the temperature-retaining apparatus (temperature-retaining means), a container provided with a heater or the like can be used.

The temperature retained by the temperature-retaining apparatus is preferably 40° C. to 200° C., more preferably 50° C. to 150° C., with 60° C. to 100° C. being further preferable. By retaining the temperature, the temperature of the pulverizer can be stably controlled. If the temperature is less than 40° C., glassification takes time, thereby leading to insufficient production efficiency. If the temperature exceeds 300° C., unfavorable crystals may be precipitated. It is preferred that the raw material be reacted in a hydrocarbon-based solvent to allow a solid electrolyte to be synthesized in the temperature-retaining apparatus.

The reaction is preferably conducted at a high temperature since a reaction proceeds at a high speed in a high-temperature zone. However, if the temperature of a pulverizer exceeds 80° C., mechanical problems such as wear may occur. Therefore, it is preferred that the temperature be retained higher in the temperature-retaining apparatus, and the temperature be retained relatively lower in the pulverizer.

By drying a reaction product and removing the solvent therefrom, a sulfide-based solid electrolyte as sulfide glass is obtained.

If the ionic conductivity is improved when crystallized, it is preferable to crystallize. For example, a solid electrolyte obtained from a raw material having a ratio $Li_2S:P_2S_5$ (molar ratio) of 68:32 to 72:28 can have an improved ionic conductivity by further subjecting it to a heat treatment of 200° C. or more and 400° C. or less, more preferably 250° C. to 320° C. The reason therefor is that sulfide-based solid electrolyte becomes sulfide crystallized glass (glass ceramics).

The heat treatment time is preferably 1 hour to 5 hours, with 1.5 hours to 3 hours being particularly preferable.

As a preferable embodiment, the heating in the drying process and the heating in the crystallization process are not conducted separately, but they are allowed to be a single heating process.

Figure 4:
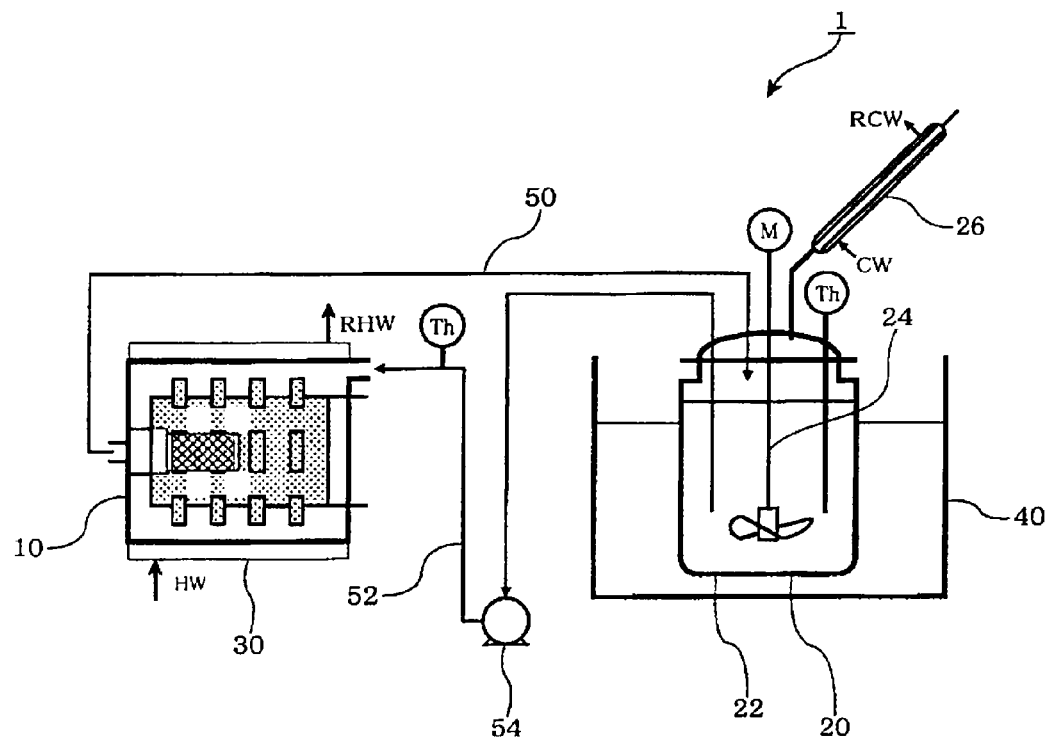
FIG. 4 is a view showing one example of an apparatus that can be used in the production methods according to the first and second inventions.

FIG. 4 shows one example of an apparatus which can be used when the method for producing a solid electrolyte of the invention is implemented.

When a solid electrolyte is produced by using this apparatus 1, a slurry is respectively supplied to a pulverizer 10 and a temperature-retaining tank 20. Hot water (HW) is placed in a heater 30 and then discharged (RHW). While keeping the temperature of the pulverizer 10 by means of the heater 30 at 20° C. to 80° C., for example, the raw material is allowed to react while being pulverized in a solvent, whereby a solid electrolyte is synthesized. The temperature of the temperature-retaining tank 20 is retained by means of an oil bath 40 at 60° C. to 300° C., for example. Preferably, the raw material is reacted in a solvent and a solid electrolyte is synthesized in the temperature-retaining tank 20. At this time, a stirring blade 24 is allowed to rotate by means of a motor (M) to stir the slurry, thereby preventing precipitation of the raw material. A cooling water (CW) is introduced into a cooling tube 26 and then discharged (RCW). The cooling tube 26 cools and liquefies a gasified solvent in a vessel 22. The liquefied solvent is returned to the vessel 22. During the time period in which a solid electrolyte is synthesized by the pulverizer 10, by means of a pump 54, the slurry is circulated between the pulverizer 10 and the temperature-retaining tank 20 after passing through connecting tubes 50 and 52.

When the pulverizer contains a ball, in order to prevent mixing of the ball from the pulverizer 10 to the temperature-retaining tank 20, a filter that separates the ball from the raw material and solvent may be provided in the pulverizer 10 or a first connecting tube 50.

The ratio of the capacity of the temperature-retaining tank 20 and the capacity of the pulverizer 10 may be arbitral, but normally, the capacity of the temperature-retaining tank 20 is about 1 to 100 times that of the capacity of the pulverizer 10.

Figure 5:
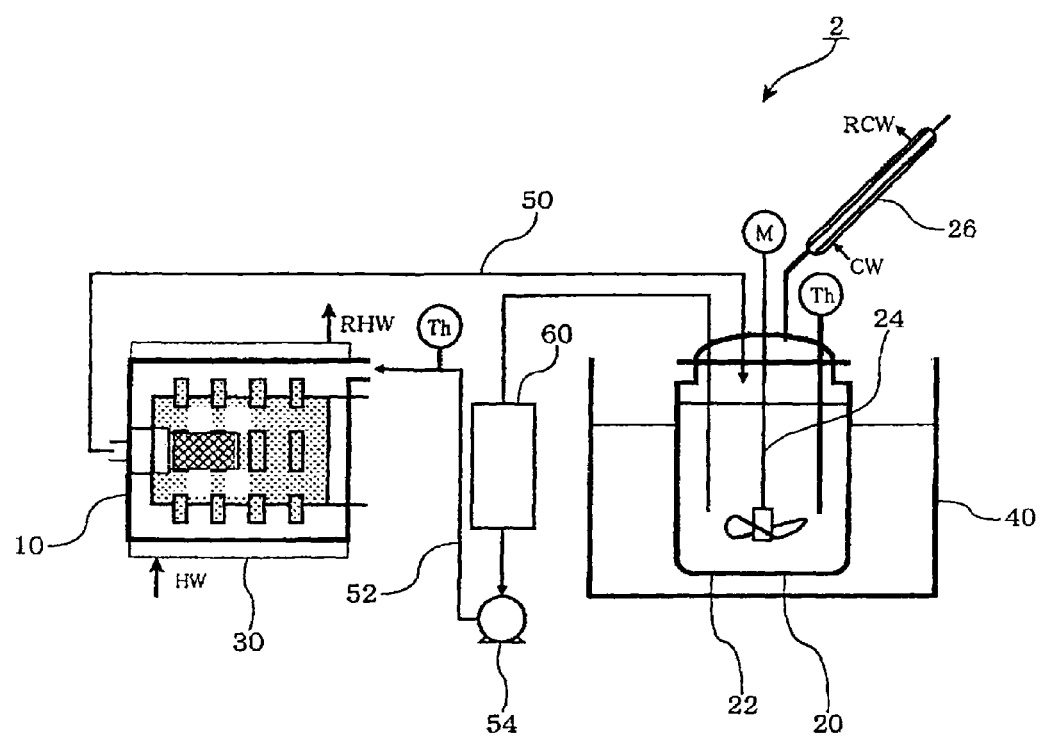
FIG. 5 is a view showing another example of an apparatus that can be used in the production methods according to the first and second inventions.

FIG. 5 is a view showing another production apparatus.

A production apparatus 2 is the same as the above-mentioned production apparatus 1 except that a heat exchanger 60 (heat exchanging means) is attached to a second connection part 52. The same elements are indicated by the same numerals, and a detailed explanation is omitted.

The heat exchanger 60 cools the raw material having a high temperature and the solvent that are supplied from the temperature-retaining tank 20, and then supplies them to a stirrer 10. For example, if a reaction is conducted in the temperature-retaining tank 20 at a temperature exceeding 80° C., the raw material or the like is cooled to 80° C. or less, and then sent to the stirrer 10.

The solid electrolyte obtained by the production method of the invention can be used as a solid electrolyte layer or as a solid electrolyte to be mixed with a cathode mix of an all-solid lithium secondary battery, or the like.

For example, in addition to a cathode and an anode, by forming a layer comprising the solid electrolyte obtained by the production method of the invention between the cathode and the anode, an all-solid lithium secondary battery is obtained.

Third Invention

Method for Producing an Ionic Conductive Substance

The method for producing an ionic conductive substance of the invention comprises a first process in which one or more compounds selected from phosphor sulfide, germanium sulfide, silicon sulfide and boron sulfide (hereinafter referred to as the "first sulfide") and an alkali sulfide metal compound or an alkaline earth metal sulfide (hereinafter referred to as the "second sulfide") are brought into contact in a solvent with stirring, and the contact is completed under predetermined conditions, and a second process in which a product obtained in the first process is subjected to a mechanical treatment.

In the first process, an ionic conductive substance can be produced by allowing the first sulfide and the second sulfide to contact while stirring in a solvent. In the contact reaction, the ionic conductive substance may contain the first sulfide and/or the second sulfide that remain unreacted. In such a case, in the method for producing an ionic conductive substance of the invention (hereinafter, simply referred to as the "production method of the invention"), by subjecting a product obtained in the first process to a mechanical treatment, the reaction of the first sulfide and/or the second sulfide that remain unreacted can be completed.

By pulverizing not the raw material but the product (an ionic conductive substance containing an unreacted raw material), the product is pulverized while proceeding a reaction. Therefore, the control of the grain diameter and the control for completing the reaction can be conducted simultaneously.

As the method for producing a sulfide-based solid electrolyte, in addition to the methods disclosed in the above-mentioned WO2005/119706 or the JP-A-H11-134937, a method disclosed in WO2009/047977 in which a solid electrolyte is produced by reacting the raw material while stirring in a hydrocarbon solvent can be given. Further, JP-A-2010-140893 discloses a method for producing a solid electrolyte using a solid electrolyte production apparatus having a pulverizing synthesis means, in which a raw material containing lithium sulfide and other sulfides is reacted in a hydrocarbon-based solvent.

However, in the method disclosed in WO2009/047977, in order to obtain a highly-pure sulfide-based solid electrolyte, it is required to finely pulverize lithium sulfide or the like as the raw material by applying a mechanical force, and at the same time, a long period of time is required to produce a sulfide-based solid electrolyte. Further, in JP-A-2010-140893, since it is required to move the pulverizing synthesis means all the time, although the required amount of energy becomes small as compared with the technology disclosed in Patent Document 2, a large amount of energy is still required.

Therefore, it is required to reduce the amount of energy used in the production as compared with the production method disclosed in JP-A-2010-140893, as well as to shorten the production time as compared with the production method disclosed in WO2009/047977.

It is possible to produce only in the first process an ionic conductive substance that does not contain the first sulfide and the second sulfide remained. However, since no mechanical energy is exerted only by the contact reaction, a significantly long reaction time is required.

The mechanical treatment in the second process is to exert mechanical energy which is large enough to pulverize the raw material by means of a milling apparatus, and is different from the stirring in the first process. The first and second processes are conducted in a batch-wise manner.

In the invention, by conducting the first process, an ionic conductive substance in which the first sulfide and/or the second sulfide remain unreacted can be produced, and by conducting the second process, an ionic conductive substance in which no first sulfide and second sulfide remain unreacted can be produced while shortening the reaction time.

Even though the raw material is pulverized, as compared with a production method in which the raw material is pulverized and only the first process is conducted, by conducting both the first process and the second process, the production time can be shortened.

Hereinbelow, each process will be explained.

[First Process]

(1) First Sulfide

A first sulfide is one or more compounds selected from phosphor sulfide, germanium sulfide, silicon sulfide and boron sulfide. Preferably, the first sulfide is phosphor sulfide, with phosphorus pentasulfide being more preferable.

As the first sulfide, a commercially-available product can be used. However, it is preferred that it have a high purity.

When the first sulfide is phosphorus pentasulfide ($P_2S_5$), no specific restrictions are imposed on phosphorous pentasulfide as long as it is produced and sold on the industrial basis. The purity of phosphorous pentasulfide is preferably 95% or more, with 99% or more being further preferable.

The molecular formula of phosphorus pentasulfide ($P_2S_5$) is $P_4S_{10}$, but here, it is taken as $P_2S_5$. Therefore, in Examples or the like, phosphorus pentasulfide is described to have a molecular weight of 222.3.

Instead of $P_2S_5$, phosphor (P) as a simple substance and sulfur (S) as a simple substance having a corresponding molar ratio can be used. No specific restrictions are imposed on the phosphor (P) as a simple substance and sulfur (S) as a simple substance as long as they are produced and sold on the industrial basis.

(2) Second Sulfide

A second sulfide is an alkali metal sulfide compound or an alkaline earth metal sulfide. Specific examples of the alkali metal sulfide compound or the alkaline earth metal sulfide include lithium sulfide, sodium sulfide, potassium sulfide, rubidium sulfide, cesium sulfide, beryllium sulfide, magnesium sulfide, calcium sulfide, strontium sulfide, barium sulfide or the like. Of these, lithium sulfide and sodium sulfide are preferable, with lithium sulfide being particularly preferable.

If the second sulfide is lithium sulfide, no specific restrictions are imposed. For example, commercially-available lithium sulfide can be used. Highly-pure lithium sulfide is preferable.

As for lithium sulfide, the total content of lithium salts of a sulfur oxide is preferably 3.0 mass % or less, more preferably 2.5 mass % or less. The content of lithium N-methylaminobutyrate is preferably 0.15 mass % or less, more preferably 0.1 mass % or less. The content of lithium hydroxide is preferably 4.0 mass % or less, more preferably 3.0 mass % or less. The content of lithium carbonate is preferably 2.0 mass % or less, more preferably 1.0 mass % or less. The content of lithium hydrogen sulfide is preferably 2.0 mass % or less, more preferably 1.0 mass % or less. The total content of metals other than lithium, i.e. sodium, potassium, magnesium, iron or the like is preferably 1.0 mass % or less, with 0.1 mass % being more preferable.

Lithium sulfide as the second sulfide can be produced by the following NMP method (A) or the hydrocarbon-based organic solvent method (B). The resulting lithium sulfide may further be subjected to a pulverization treatment (C).

(A) NMP Method

As for the method for producing lithium sulfide, no specific restrictions are imposed as long as the amount of impurities can be at least reduced. For example, it can be obtained by purifying lithium sulfide produced by the following methods a to c. Of the following methods, the method a or b is particularly preferable.

a. A method in which lithium hydroxide and hydrogen sulfide are reacted at 0 to 150° C. in a non-protonic organic solvent to form lithium hydrogen sulfide. Then, this reaction solution is subjected to hydrodesulfurization at 150 to 200° C. (see JP-A-H07-330312).

b. A method in which lithium hydroxide and hydrogen sulfide are reacted at 150 to 200° C. to directly form lithium sulfide (see JP-A-H07-330312).

c. A method in which lithium hydroxide and a gaseous sulfur source are reacted at a temperature of 130 to 445° C. (see JP-A-H09-283156).

No specific restrictions are imposed on the method for purification of lithium sulfide obtained as mentioned above. As the preferable purification method, a purification method disclosed in WO2005/40039 can be given. Specifically, lithium sulfide obtained as above is washed at a temperature of 100° C. or more by using an organic solvent.

It is preferred that the organic solvent used for the washing be a non-protonic polar solvent. Further, it is more preferred that the non-protonic organic solvent used in the production of lithium sulfide be the same as that used for the washing.

As the non-protonic polar organic solvent preferably used in the washing, a non-protonic polar organic compound such as an amide compound, a lactam compound, a urea compound, an organic sulfur compound and a cyclic organic phosphor compound or the like can be given. These solvents can preferably be used as a single solvent or a mixed solvent. In particular, N-methyl-2-pyrollydone (NMP) is selected as a good solvent.

The amount of the organic solvent used in the washing is not particularly restricted, and the frequency of the washing is not particularly restricted. However, it is preferable to conduct washing twice or more. It is preferred that washing be conducted under an inert gas such as nitrogen and argon.

By drying the washed lithium sulfide at a temperature which is equal to or higher than the boiling point of the organic solvent used for washing in an inert gas atmosphere such as nitrogen under normal pressure or reduced pressure for 5 minutes or more, preferably about 2 to 3 hours, purified lithium sulfide can be obtained.

(B) Hydrocarbon-Based Organic Solvent Method

Lithium hydroxide and hydrogen sulfide are reacted by blowing a hydrogen sulfide gas to a slurry composed of lithium hydroxide and a hydrocarbon-based solvent. The reaction is continued while removing water generated by the reaction from the slurry. After the water content in the reaction system is substantially removed, blowing of an inert gas is stopped, whereby lithium sulfide can be produced (JP-A-2010-163356).

Lithium sulfide prepared by the hydrocarbon-based organic solvent method may be used as the second sulfide after drying once. Alternatively, it may be used as the second sulfide in the state of a slurry solution.

(C) An Increase in the Specific Surface Area of Lithium Sulfide

As for lithium sulfide, one obtained by the above-mentioned method can be directly used. Alternatively, lithium oxide may be subjected to a treatment (modification treatment) for increasing the specific surface area of lithium sulfide by the technique mentioned below.

Further, by conducting a modification treatment, there are advantages that the specific surface area of lithium sulfide is increased and the particle size is also decreased.

In addition, by pulverizing lithium sulfide, it is possible to shorten the time of the first process. Further, it is supposed that the reaction also proceeds inside lithium sulfide with a decrease in particle size of lithium oxide.

As for the method for increasing the specific surface area of lithium sulfide, the same modification method as the above-mentioned second invention can be mentioned.

(3) Production of an Ionic Conductive Substance

By allowing the first sulfide to contact with the second sulfide in a solvent with stirring, an ionic conductive substance can be synthesized.

The contact can be conducted in an organic solvent. The organic solvent is preferably a non-aqueous solvent. Specific examples of the non-aqueous solvent include hexane, heptane, octane, toluene, xylene, ethyl benzene, cyclohexane, methyl cyclohexane and petroleum ether.

As for the mixing ratio of the first sulfide and the second sulfide, in the case where the first sulfide is phosphorous sulfide and the second sulfide is lithium sulfide, for example, they are mixed such that the amount ratio becomes 60:40<Li:P≤85:15 (molar ratio), preferably 65:35<Li:P83:17 (molar ratio), further preferably 67:33<Li:P≤81:19 (molar ratio).

If the mixing ratio is outside this range, the ionic conductivity of the electrolyte may be lowered.

An example in which the first sulfide is phosphorous sulfide and the second sulfide is lithium sulfide is given above. However, the same can be applied to a combination of other first sulfides and other second sulfides.

As for the concentration of the contact reaction solution, the amount of a solid component as the reactive substrate (the first sulfide and the second sulfide) relative to the reaction solvent is preferably 0.1 to 70 wt %, more preferably 0.5 to 50 wt %.

If the concentration of the reactive substrate in the solvent exceeds 70 wt %, homogenous stirring may become difficult by normal stirring. On the other hand, if the concentration of the reactive substrate in the solvent is less than 0.1 wt %, the productivity may be lowered.

The contact reaction temperature is 50 to 210° C., for example, preferably 60 to 180° C., with 100 to 180° C. being more preferable.

If the reaction temperature exceeds 210° C., since the reaction and the crystallization proceed simultaneously, the reaction does not proceed, whereby the amount of remaining sulfide such as remaining lithium sulfide may become large. If the temperature is less than 50° C., the reaction may not proceed smoothly.

It is preferred that the contact reaction be conducted in the atmosphere of an inert gas such as nitrogen and argon. The dew point of the inert gas is preferably −20° C. or less, with −40° C. or less being particularly preferable. The pressure is normally from normal pressure to 100 MPa, preferably from normal pressure to 20 MPa.

The contact reaction time is 1 to 200 hours, for example, with 4 to 180 hours being preferable.

If the reaction time is less than 1 hour, the reaction may not proceed. If the reaction time is too long, the ionic conductivity may be lowered, although the reason therefor is unclear.

In the first process, the contact is completed under prescribed conditions.

The prescribed conditions are as follows, for example. The first process is conducted for 50% or more and 99% or less, preferably 60% or more and 98% or less of the total of the reaction time of the first process and the reaction time of the second process, and for the rest of the time, the second process is conducted or the second process and the third process are conducted repeatedly.

[Second Process]

In the second process of the production method of the invention, the product obtained in the first process is subjected to a mechanical treatment.

It is preferred that the mechanical treatment mean that the product obtained in the first step be subjected to a mechanical milling treatment in a solvent. As for the solvent used in the mechanical milling, the same solvent as that used in the first process can be used. Therefore, the transfer from the first process to the second process can be realized by subjecting a slurry solution containing the product of the first process to a mechanical treatment as it is.

It is also possible to conduct transfer by drying the slurry solution to obtain dry powder of the product, followed by addition of a solvent.

Alternatively, the slurry solution may be dried to obtain dry power of the product, and the dry power may be subjected to a mechanical milling treatment without adding a solvent.

Various types of pulverization methods can be used for the mechanical milling treatment. It is particularly preferable to use a planetary ball mill. In a planetary ball mill, while a pot is rotating, the table is revolving, whereby a significantly high impact energy can be generated efficiently. A beads mill is also preferable.

The rotation speed and the rotation time of the mechanical milling treatment are not particularly restricted. However, the higher the rotation speed is, the higher the formation speed of a glass-like electrolyte. A longer rotation time leads to a higher conversion ratio of the raw material to a glass-like electrolyte.

However, if the rotation speed of the mechanical milling treatment is high, a heavy burden may be imposed on a pulverizer. If the rotation time is prolonged, production of a glass-like electrolyte takes time.

For example, if a planetary ball mill is used, it suffices to conduct rotation at a speed of 250 rpm or more and 300 rpm or less for 5 minutes or more and 50 hours or less. A more preferable reaction time is 10 minutes or more and 40 hours or less.

If a beads mill is used, for example, the rotation is conducted at a speed of 100 rpm or more and 10000 rpm or less for 5 minutes or more and 24 hours or less. A more preferable reaction time is 10 minutes or more and 12 hours or less.

In the second process, by conducting a mechanical milling treatment preferably in the presence of a solvent, the treatment time can be shortened. Heating can be conducted from 20° C. to 200° C., according to need. A preferable heating temperature is 20° C. or more and 80° C. or less, with 30° C. or more and 80° C. or less being more preferable.

If heating is conducted at a temperature of 80° C. or less, the wear of the ball of the ball milling machine can be prevented.

Further, by conducting a mechanical milling treatment in the presence of a solvent, granulation at the time of the treatment can be suppressed, whereby the synthesis reaction can be promoted efficiently. As a result, an ionic conductive substance with a high degree of homogeneity and has a low content of the raw material remains unreacted. In addition, adhesion of the raw material or the reaction product to the apparatus wall or the like can be prevented, and as a result, the yield of the product can be improved.

By conducting the above-mentioned mechanical milling treatment, the ionic conductive substance of the invention can be obtained.

If the mechanical treatment is a mechanical milling treatment in a solvent, when the resulting ionic conductive substance is used in the state of a slurry solution, after the reaction, it may be used after removing a supernatant or after adding a non-aqueous solvent and transferring to other container.

When the ionic conductive substance is used as dry powder, it is required to remove the solvent. This can be conducted in the vacuum or in the atmosphere of nitrogen at room temperature or under heated conditions. If the removal of the solvent is conducted under heated conditions, the heating temperature is 40 to 200° C., for example, preferably 50 to 160° C. If the temperature is higher than these, crystallization may proceed to deteriorate the conductivity performance. Further, if the temperature is low, the remaining solvent may not be removed completely.

By the above-mentioned removal treatment, the amount of the remaining solvent in the product is 5 wt % or less, for example, preferably 3 wt % or less. If the amount of the remaining solvent is large, a non-conductor which functions as a resistance component is formed in the electrolyte, thereby leading to lowering of battery performance.

[Third Process]

According to the production method of the invention, it is possible to produce an ionic conductive substance only by the first process and the second process. However, it may further include the third process.

In the third process, the product which has been subjected to a mechanical treatment in the second process is stirred in a solvent.

Here, the third process is a process in which a product obtained in the second process (including a product containing an unreacted raw material) is placed in a container or the like together with a solvent without being subjected to a mechanical treatment, and stirring or the like is conducted to cause the raw material remained unreacted in the product to be reacted.

The same solvent as that used in the first process can be used in the third process, and the stirring in the third process can be conducted under the similar stirring conditions (contact temperature, contact time) as those in the first process. That is, the solvent and stirring conditions used in the third process may be completely the same as those in the first process. The apparatus and conditions in the first process can be used as they are.

In the production method of the invention, the product which has been stirred in the above-mentioned third process is preferably further subjected to a mechanical treatment in the second process. The third process and the second process are repeated alternately. By such repetition, an ionic conductive substance having only a small amount of an unreacted material can be produced.

No specific restrictions are imposed on the number of the repetition of the third process and the second process, and these processes may be repeated appropriately.

The repetition of the third process and the second process can be implemented by using an apparatus shown in FIG. 4 or FIG. 5, which is explained with reference to the second invention. Specifically, the second process can be implemented by the pulverizer 10 and the third process can be implemented by the temperature-retaining tank 20.

[Ionic Conductive Substance]

The ionic conductivity of the ionic conductive substance obtained by the production method of the invention is preferably $1\times10^{-6}$ S/cm or more, with $5\times10^{-6}$ S/cm being more preferable.

In the invention, the ionic conductivity is a value obtained by the alternating current impedance method. The details thereof will be explained in Examples.

The average particle diameter of the ionic conductive substance is 50 μm or less and 0.1 μm or more, preferably 30 μm or less and 0.2 μm or more. If the average particle diameter is larger than this, when a battery is produced, the thickness of the electrolyte layer may become un-uniform, causing short circuit.

The above-mentioned particle diameter can be measured by means of a laser. It is desirable to conduct such measurement directly in the state of a slurry, without passing through the dried state. Once drying is conducted, aggregation of particles may be generated, leading to an apparently large particle size.

By crystallizing by heating, an ionic conductive substance (ionic conductive glass) having a higher ionic conductivity (e.g. a solid electrolyte obtained from a raw material of which the $Li_2S:P_2S_5$ (molar ratio) is 68:32 to 72:28) may be obtained.

The heating temperature is 80° C. or more and 400° C. or less, preferably 170° C. or more and 380° C. or less, with 180° C. or more and 360° C. or less being more preferable. If the heating temperature is less than 80° C., crystallized glass having a high crystallization degree may not be obtained. If the heating temperature exceeds 400° C., crystallized glass having a low crystallization degree may be generated.

The above-mentioned heating may be conducted for an ionic conductive substance in the state of a slurry.

It is preferred that the ionic conductive glass be heated at a dew point of −40° C. or less, more preferably at a dew point of −60° C. or less.

The pressure at the time of heating may be normal pressure or reduced pressure.

The atmosphere may be air or an inert gas.

The heating time may preferably be 0.1 hour or more and 24 hours or less, more preferably 0.5 hours or more and 12 hours or less.

By the above-mentioned heating treatment, a crystallized ionic conductive substance can be obtained.

The crystallized ionic conductive substance may be totally crystallized, or a part thereof may be crystallized and the remaining part may be amorphous. A crystal substance which is crystallized by the above-mentioned crystallization method is supposed to have a higher ionic conductivity than that of an amorphous substance.

The crystallization degree of the crystallized ionic substance is preferably 50% or more, more preferably 70% or more. If 50% or more is crystallized, effects of improving ionic conductivity by crystallization are further enhanced.

The above-mentioned ionic conductive substance and the crystallized ionic conductive substance can be used as the material for a battery.

In the first embodiment of the battery, it contains at least one of the crystallized ionic conductive substance and the ionic conductive substance. The crystallized ionic conductive substance and the ionic conductive substance may be contained in the electrolyte layer or in the electrode layer of the battery. They may be contained in both of the electrolyte layer and the electrode layer.

In another embodiment of the battery, it is produced by using at least one of the crystallized ionic conductive substance and the ionic conductive substance. The crystallized ionic conductive substance and the ionic conductive substance may be used in the electrolyte layer of the battery or in the electrode layer. They may be used in both of the electrolyte layer and the electrode layer.

For the constitutional elements of the battery (e.g. an electrode active substance, a conductive assistant, a collector or the like), known elements can be used. Elements which will be invented in the future can also be applied.

As for the production method of the battery, a known production method can be applied, and a production method which will be invented later may also be applied.

EXAMPLES

Production Example 1

Production of Lithium Sulfide

In the atmosphere of nitrogen, 270 g of toluene as a non-polar solvent was added to a 600 ml-separable flask. Then, 30 g of lithium hydroxide (manufactured by Honjo Chemical Corporation) was incorporated, and the resultant was retained at 95° C. while stirring at 300 rpm by means of a fullzone stirrer. While blowing hydrogen sulfide at a supply speed of 300 ml/min, the slurry was heated to 104° C. From the separable flask, an azeotropic gas of water and toluene was continuously discharged. Dehydration was conducted by condensing this azeotropic gas by a condenser placed outside the reaction system. During this time, the same amount of toluene as that distilled off was continuously supplied, the level of the reaction liquid was retained at a constant level.

The amount of water in the condensed liquid was gradually decreased. After 6 hours from the introduction of hydrogen sulfide, distillation of water was no longer observed (the total water amount was 22 ml). During the reaction, a state in which solids were dispersed in toluene and stirred was kept, and there was no water content separated from toluene. Thereafter, hydrogen sulfide was changed to nitrogen, and nitrogen was circulated for one hour at 300 ml/min. The solid matters were filtrated and dried to obtained lithium sulfide as white powder.

The resulting powder was analyzed by the hydrochloric titration and the silver nitrate nitration. It was found that the purity of lithium sulfide was 99.0%. As a result of an X-ray diffraction analysis, it was confirmed that no peak other than the crystal pattern of lithium sulfide was observed. The average particle size was 450 μm (slurry solution).

The specific surface area of the resulting lithium sulfide was measured by the BET method by using a nitrogen gas, by means of AUTOSORB6 (manufactured by Sysmex Corporation), and was found to be 14.8 m$^2$/g. The pore volume was measured by the same apparatus for measuring the specific surface area. The pore volume was obtained from the measurement point of a relative pressure of P/P$_0$ of 0.99 or more by interpolating to 0.99, and was found to be 0.15 ml/g.

Production Example 2

Pulverization Treatment 26 g of lithium sulfide obtained in Production Example 1 was weighed in a Schlenk cocked-bottle in a glove box. In a nitrogen atmosphere, 50 ml of dehydrated toluene (manufactured by Wako Pure Chemical Industries, Ltd.) and 250 ml of dehydrated ethanol (manufactured by Wako Pure Chemical Industries, Ltd.) were added in this sequence, and the resultant was stirred by means of a stirrer at room temperature for 24 hours. After the modification treatment, the bath temperature was raised to 120° C., and a hydrogen sulfide gas was circulated at a rate of 200 ml/min for 90 minutes to conduct a treatment. After the hydrogen sulfide gas treatment, the solvent was distilled off in the atmosphere of nitrogen at room temperature. Further, in the vacuum, drying was conducted for 2 hours to collect pulverized lithium sulfide.

The thus pulverized lithium sulfide was evaluated in the same manner as in the Production Example 1. Lithium sulfide had a purity of 97.2%, a lithium hydroxide content of 0.3%, an average particle diameter of 9.1 μm (un-dried slurry solution), a specific surface area of 43.2 m$^2$/g and a pore volume of 0.68 ml/g. The purity and the lithium hydroxide content were quantitatively measured by the titration method. The reason that the total of the analysis values was not 100% is that it contained lithium carbonate, other ionic salts and a remaining solvent.

Production Example 3

Pulverization Treatment

Lithium sulfide produced in Production Example 1 was pulverized in a nitrogen atmosphere by means of a jet mil apparatus (manufactured by Aishin Nano Technologies, Co., Ltd.). The collected lithium sulfide had a specific surface area of 20.0 m$^2$/g, a particle size of 2.1 μm and a pore volume of 0.17 ml/g.

Production Example 4

Production of Lithium Sulfide

Lithium sulfide was produced in accordance with the method of the first embodiment (2-process method) disclosed in Japanese Patent No. 3528866 (JP-A-H07-330312). Specifically, in a 10 L-autoclave provided with a stirring blade, 3326.4 g (33.6 mol) of N-methyl-2-pyrrolidone (NMP) and 287.4 g (12 mol) of lithium hydroxide were placed, stirred at 300 rpm, and the temperature was elevated to 130° C. After the heating, hydrogen sulfide was blown to the liquid at a supply speed of 3 L/min for 2 hours. Subsequently, this reaction liquid was heated in a nitrogen atmosphere (200 cc/min), and the reacted lithium hydrogen sulfide was hydrosulfur-ized, thereby to obtain lithium sulfide. As the temperature was raised, water obtained as a by-product due to the reaction of hydrogen sulfide and lithium hydroxide started to evaporate. This water was condensed by means of a condenser and withdrawn outside the reaction system. Simultaneously with distillation off of the water outside the system, the temperature of the reaction liquid was elevated. When the temperature reached 180° C., the heating was stopped, and the temperature was retained at constant. After the completion of the hydrodesulfurization of lithium hydrogen sulfide (after about 80 minutes), the reaction was completed, whereby lithium sulfide was obtained.

[Purification of Lithium Sulfide]

NMP in 500 mL of the slurry reaction solution (NMP-lithium sulfide slurry) obtained above was subjected to decantation, and 100 mL of dehydrated NMP was added. The resulting mixture was stirred at 105° C. for about 1 hour. Further, 100 mL of NMP was added, and the resultant was stirred at 105° C. for about 1 hour. At that temperature, NMP was subjected to decantation. The similar operation was repeated four times in total. After the completion of the decantation, in a nitrogen atmosphere at 230° C. (a temperature which is higher than the boiling point of NMP), lithium sulfide was dried for 3 hours at normal pressure. The content of impurities in the resulting lithium sulfide was measured.

The content of each of sulfur oxides, i.e. lithium sulfite ($Li_2SO_3$), lithium sulfide ($Li_2SO_4$) and lithium thiosulfate ($Li_2S_2O_3$) and lithium N-methylaminobutyrate (LMAB) was quantitatively measured by the ion chromatography method. As a result, it was found that the total content of sulfur oxides was 0.13 mass % and the content of lithium N-methylamino butyrate (LMAB) was 0.07 mass %.

The specific surface area and the pore volume of the resulting lithium as measured by the BET method using a nitrogen gas by using AUTOSORBE6. The specific surface area and the pore volume were equal to or lower than the measurable lowest limit (0.1 m$^2$/g or less, and the specific surface area was 0.001 ml/g or less). Measurement was conducted by the krypton method capable of measuring a low surface area, the low surface area was found to be 0.04 m$^2$/g. The particle diameter was 190 μm.

Example of the First Invention

Example 1-1

As the raw material, 41.8 g (75 mol %) of $Li_2S$ in Production Example 1 and 67.5 g (25 mol %) of $P_2S_5$ manufactured by Sigma-Aldrich Japan K.K. were used. These powders were weighed in a dry box filled with nitrogen, and incorporated in an alumina-made pot (6.7 L) used in a planetary ball mill together with zirconia-made balls (only balls each having a diameter of 20 mm). The pot was completely sealed in the state where it was filled with a nitrogen gas. This pot was installed in a planetary ball mill machine, and, at the initial stage, milling was conducted at a low speed (rotation: 85 rpm) for several minutes in order to fully mix the raw material. Thereafter, the rotational speed was gradually increased, and mechanical milling was conducted at 370 rpm for 120 hours.

Figure 3:
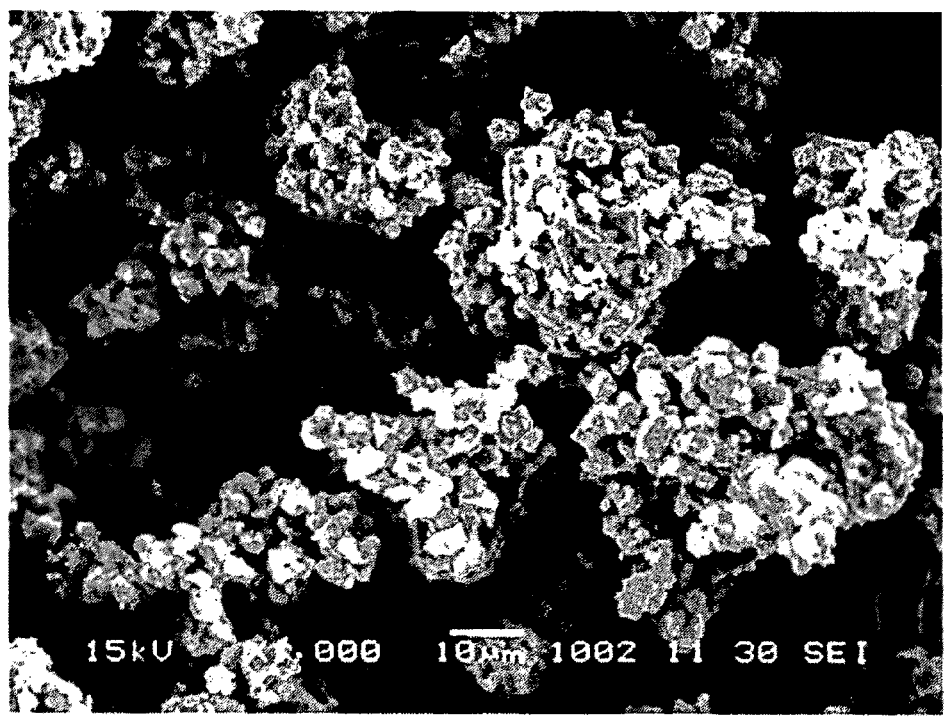
FIG. 3 is a SEM photograph of glass particles prepared in Example 1-1 of the first invention.

The SEM photograph of the collected electrolyte glass is shown in FIG. 3. In this photograph, an agglomerate of primary particles having a diameter of 1 to 5 μm or less was observed. It can be understood that the average particle size does not exceed 10 μm.

Comparative Example 1-1

An experiment was conducted in the same manner as in Example 1-1, except that 39.0 g (70 mol %) of $Li_2S$ produced in Production Example 4 and 81.0 g (30 mol %) of $P_2S_5$ manufactured by Sigma-Aldrich Japan K.K. were used as the raw material, and the pulverization time was changed to 40 hours.

Comparative Example 1-2

An experiment was conducted in the same manner as in Comparative Example 1-1, except that the pulverization time was changed to 280 hours. The ionic conductivity of the resulting glass was found to be $2.0 \times 10^{-4}$ S/cm.

The Raman spectra of glass particles obtained in Example 1-1 and Comparative Examples 1-1 and 1-2 were measured under the following conditions.

Laser Raman measurement conditions:

Measurement apparatus: Almega manufactured by ThermoFisher Scientific K.K.

Laser wavelength: 532 nm

Laser output: 10%

Aperture: 25 μm φ

Exposure time: 10 seconds

Exposure frequency: 10

Objective lens: ×100

Resolution: High (2400 lines/mm)

As for the Raman spectrum, measurement was conducted 5 times after sealing the same lot sample in a Raman tube, while changing the measurement position.

One example of the Raman spectrum of the glass particles of Example 1-1 is shown in FIG. 1.

As for the measured spectrum, the spectrum was separated into peaks by using a waveform analysis software (GRAMS AI, manufactured by Thermo Scientific K.K.)

As the example of the spectrum which was separated into each peak by using the waveform analysis software, the result of Comparative Example 1-1 is shown in FIG. 2. The three separated peaks in the original Raman spectrum show the peaks of $P_2S_7^{-4}$, $PS_4^{3-}$ and $P_{256}^{4-}$, in the order of height.

The average value of the area ratio and the standard deviation of each peak separated is shown in Table 1.

TABLE 1

|  | Area ratio (%) | Standard deviation |
|---|---|---|
| Example 1-1 |  |  |
| $PS_4^{3-}$ | 78.6 | 1.8 |
| $P_2S_7^{4-}$ | 15.6 | 2.6 |
| $P_2S_6^{4-}$ | 5.8 | 0.8 |
| Com. Ex. 1-1 |  |  |
| $PS_4^{3-}$ | 28.1 | 6.1 |
| $P_2S_7^{4-}$ | 50.8 | 6.4 |
| $P_2S_6^{4-}$ | 21.1 | 7.8 |
| Com. Ex. 1-2 |  |  |
| $PS_4^{3-}$ | 36.5 | 1.9 |
| $P_2S_7^{4-}$ | 46.4 | 3.7 |
| $P_2S_6^{4-}$ | 17.1 | 4.8 |

As for the glass particles obtained by conducting the sample preparation of Example 1-1 and Comparative Example 1-1 five times each, the ion conductivity was measured. The measurement results, the average value thereof and the standard deviation are shown in Table 2.

TABLE 2

|  | Example 1-1 | Com. Ex. 1-1 |
|---|---|---|
| Ionic conductivity | $3.86 \times 10^{-4}$ | $1.04 \times 10^{-4}$ |
| (S/cm) | $2.85 \times 10^{-4}$ | $1.09 \times 10^{-4}$ |
|  | $3.50 \times 10^{-4}$ | $1.29 \times 10^{-4}$ |
|  | $3.78 \times 10^{-4}$ | $1.95 \times 10^{-4}$ |
|  | $3.74 \times 10^{-4}$ | $1.96 \times 10^{-4}$ |
| Average value | $3.55 \times 10^{-4}$ | $1.47 \times 10^{-4}$ |
| Standard deviation | $0.41 \times 10^{-4}$ | $0.46 \times 10^{-4}$ |

It can be understood that the standard deviation of the ionic conductivity in Example 1-1 is smaller than that in Comparative Example, reflecting the Raman spectrum. The reason therefor is that the difference in standard deviation of ionic conductivity shown in Table 2 is smaller than the Raman spectrum, but the average value of the ionic conductivity in Examples is high. When the standard deviation is obtained from the average value, the standard variation is 12% in Examples and 31% in Comparative Examples. This means that the variation in conductivity performance has been improved by nearly 20%.

Example 1-2

Li/P Ratio 75/25 Mol

An apparatus 1 shown in FIG. 4 was used. As the pulverizer 10, Star mill MINICER (manufactured by Ashizawa Finetech Ltd. (0.15 L) (beads mill) was used. 450 g of 0.5 mm-diameter zirconia balls were placed. As a temperature-retaining tank 20, a 1.5 L glass-made reactor provided with a stirrer was used.

To 42.1 g (75 mol %) of lithium sulfide produced in Production Example 1 and 67.9 g (25 mol %) of $P_2S_5$ (manufactured by Sigma-Aldrich Japan K.K.), 1100 g of dehydrated toluene was added. The mixture was charged in the temperature-retaining tank and the mill. The contents were circulated by means of a pump at a flow rate of 400 mL/min, and, and the temperature-retaining tank was heated to 80° C.

By passing through hot water by external circulation in order to hold the temperature of the liquid inside at 70° C., and the mill body was operated at a circumferential speed of 8 m/s. The reaction time was 40 hours. A solid portion of the slurry containing the solid electrolyte obtained after the reaction was separated, dried under vacuum to obtain a powdery solid electrolyte. For the resulting powder, an XRD spectrum was obtained by the X-ray diffraction measurement, and it was confirmed that the peak of lithium sulfide as the raw material disappeared. The ionic conductivity of this solid electrolyte was measured and found to be $2.2 \times 10^{-4}$ S/cm.

For the solid electrolyte thus obtained, the Raman spectrum was measured in the same manner as in Example 1-1. Further, the amount of toluene contained in the solid electrolyte was measured. The results are shown in Table 3.

The amount of toluene was measured as follows.

The dry solid electrolyte was weighed in a nitrogen atmosphere. To this, dehydrated methanol was added to obtain a homogeneous solution, and the solution was subjected to gas chromatography.

Example 1-3

Li/P Ratio 75/25 Mol

A reaction was conducted in the same manner as in Example 1-2, except that lithium sulfide produced in Production Example 2 was used instead of lithium sulfide produced in Production Example 1. The reaction time was 18 hours. For the powder obtained after the reaction, an XRD spectrum was obtained by an X-ray diffraction measurement. It was confirmed that the peak of lithium sulfide as the raw material disappeared. The ionic conductivity of the resulting solid electrolyte was found to be $3.0 \times 10^{-4}$ S/cm.

The resulting solid electrolyte was evaluated in the same manner as in Example 1-2. The results are shown in Table 3.

Example 1-4

Li/P Ratio 75/25 Mol

A reaction was conducted in the same manner as in Example 1-2, except that lithium sulfide produced in Production Example 3 was used instead of lithium sulfide produced in Production Example 1. The reaction time was 18 hours. For the powder obtained after the reaction, an XRD spectrum was obtained by an X-ray diffraction measurement. It was confirmed that the peak of lithium sulfide as the raw material disappeared. The ionic conductivity of the resulting solid electrolyte was found to be $2.7 \times 10^{-4}$ S/cm.

The resulting solid electrolyte was evaluated in the same manner as in Example 1-2. The results are shown in Table 3.

Example 1-5

Li/P Ratio 80/20 Mol

The same apparatus as that in Example 1-2 was used. To 42.1 g (75 mol %) of lithium sulfide produced in Production Example 2 and 67.9 g (25 mol %) of $P_2S_5$ (manufactured by Sigma-Aldrich Japan, K.K.), 1100 g of dehydrated toluene was added. The mixture was charged in the temperature-retaining tank and the mill.

The contents were circulated by means of a pump at a flow rate of 400 mL/min, and, and the temperature-retaining tank was heated to 80° C.

By passing through hot water by external circulation in order to hold the temperature of the liquid inside at 70° C., and the mill body was operated at a circumferential speed of 8 m/s. The reaction time was 20 hours. A solid portion of the slurry containing the solid electrolyte obtained after the reaction was separated, dried under vacuum to obtain a powdery solid electrolyte. For the resulting powder, an XRD spectrum was obtained by the X-ray diffraction measurement, and it was confirmed that the peak of lithium sulfide as the raw material disappeared. The ionic conductivity of this solid electrolyte was measured and found to be $2.8 \times 10^{-4}$ S/cm.

For the solid electrolyte thus obtained, the Raman spectrum was measured in the same manner as in Example 1-2. Further, the amount of toluene contained in the solid electrolyte was measured. The results are shown in Table 3.

TABLE 3

|  | Area ratio (%) | | | Standard deviation | | | Amount of toluene |
|---|---|---|---|---|---|---|---|
|  | $PS_4^{3-}$ | $P_2S_7^{4-}$ | $P_2S_6^{4-}$ | $PS_4^{3-}$ | $P_2S_7^{4-}$ | $P_2S_6^{4-}$ | wt % |
| Example 1-2 | 80 | 11.6 | 8.4 | 1.1 | 0.9 | 0.9 | 2.2 |
| Example 1-3 | 80.6 | 11.4 | 8 | 1.2 | 0.8 | 0.8 | 2.4 |

TABLE 3-continued

|  | Area ratio (%) | | | Standard deviation | | | Amount of toluene |
|---|---|---|---|---|---|---|---|
|  | $PS_4^{3-}$ | $P_2S_7^{4-}$ | $P_2S_6^{4-}$ | $PS_4^{3-}$ | $P_2S_7^{4-}$ | $P_2S_6^{4-}$ | wt % |
| Example 1-4 | 79.8 | 12.3 | 7.9 | 1 | 0.8 | 0.7 | 2.5 |
| Example 1-5 | 83.2 | 8 | 8.9 | 1.2 | 1.5 | 0.4 | 1.9 |

Examples of the Second Invention

Referential Example 2-1

Li/P Ratio 70/30 Mol

An apparatus 1 shown in FIG. 4 was used. As the pulverizer 10, Star mill MINICER (manufactured by Ashizawa Finetech Ltd. (0.15 L) (beads mill) was used. 450 g of 0.5 mm-diameter zirconia balls were placed. As a temperature-retaining tank 20, a 1.5 L glass-made reactor provided with a stirrer was used.

To 39.05 g (70 mol %) of lithium sulfide produced in Production Example 1 and 80.95 g (30 mol %) of $P_2S_5$ (manufactured by Sigma-Aldrich Japan K.K.), 1100 g of dehydrated toluene was added. The mixture was charged in the temperature-retaining tank and the mill.

The contents were circulated by means of a pump at a flow rate of 400 mL/min, and the temperature-retaining tank was heated to 80° C.

By passing through hot water by external circulation in order to hold the temperature of the liquid inside at 70° C., and the mill body was operated at a circumferential speed of 8 m/s. The reaction time was 10 hours. A solid portion of the slurry containing the solid electrolyte obtained after the reaction was separated, dried under vacuum to obtain a powdery solid electrolyte. For the resulting powder, an XRD spectrum was obtained by the X-ray diffraction measurement, and it was confirmed that the peak of lithium sulfide as the raw material disappeared.

The ionic conductivity of this solid electrolyte was measured and found to be $1.6 \times 10^{-4}$ S/cm.

Further, the solid electrolyte was subjected to a heat treatment at 300° C. for 2 hours, whereby glass ceramic electrolyte was obtained. The ionic conductivity was $2.0 \times 10^{-3}$ S/cm.

The ionic conductivity was measured by the following method.

A sulfide-based solid electrolyte was charged in a tablet molding machine. A pressure of 4 to 6 MPa was applied to obtain a molded product. Further, an electrode mixture obtained by mixing carbon and glass ceramic electrolyte at a weight ratio of 1:1 was put on the both sides of the molded product. A pressure was again applied by the tablet molding machine, whereby a molded product (diameter: about 10 mm, thickness: about 1 mm) was produced. For this molded product, the ionic conductivity was measured by the alternating current impedance method. As the value of the ionic conductivity, a numerical value at 25° C. was used.

The X-ray diffraction measurement of the resulting solid electrolyte was conducted by means of an X-ray generating apparatus (Ultima-III manufactured by Rigaku Corporation) (CuKα:λ=1.5418 Å).

Referential Example 2-2

Li/P Ratio 70/30 Mol

A reaction was conducted in the same manner as in Referential Example 2-1, except that lithium sulfide produced in Production Example 2 was used instead of lithium sulfide produced in Production Example 1. The reaction time was 6 hours. For the powder obtained after the reaction, an XRD spectrum was obtained by an X-ray diffraction measurement. It was confirmed that the peak of lithium sulfide as the raw material disappeared. The ionic conductivities of the solid electrolyte and the glass ceramic electrolyte were found to be $1.7 \times 10^{-4}$ S/cm and $2.1 \times 10^{-3}$ S/cm.

Referential Example 2-3

Li/P Ratio 70/30 mol

A reaction was conducted in the same manner as in Referential Example 2-1, except that lithium sulfide produced in Production Example 3 was used instead of lithium sulfide produced in Production Example 1. The reaction time was 6 hours. For the powder obtained after the reaction, an XRD spectrum was obtained by an X-ray diffraction measurement. It was confirmed that the peak of lithium sulfide as the raw material disappeared. The ionic conductivities of the solid electrolyte and the glass ceramic electrolyte were found to be $1.6 \times 10^{-4}$ S/cm and $1.9 \times 10^{-3}$ S/cm.

Comparative Example 2-1

Li/P Ratio 70/30 Mol

A reaction was conducted in the same manner as in Referential Example 2-1, except that lithium sulfide produced in Production Example 4 was used instead of lithium sulfide produced in Production Example 1. The reaction time was 12 hours. For the powder obtained after the reaction, an XRD spectrum was obtained by an X-ray diffraction measurement. It was confirmed that the peak of lithium sulfide as the raw material disappeared. The ionic conductivities of the solid electrolyte and the glass ceramic electrolyte were found to be $1.2 \times 10^{-4}$ S/cm and $1.8 \times 10^{-3}$ S/cm.

Referential Example 2-4

Li/P Ratio 75/25 Mol

The same apparatus as that in Referential Example 1-2 Was Used. To 42.1 g (75 mol %) of lithium sulfide produced in Production Example 1 and 67.9 g (25 mol %) of $P_2S_5$ (manufactured by Sigma-Aldrich Japan K.K.), 1100 g of dehydrated toluene was added. The mixture was charged in the temperature-retaining tank and the mill.

The contents were circulated by means of a pump at a flow rate of 400 mL/min, and the temperature-retaining tank was heated to 80° C.

By passing through hot water by external circulation in order to hold the temperature of the liquid inside at 70° C., and the mill body was operated at a circumferential speed of 8 m/s. The reaction time was 40 hours. A solid portion of the slurry containing the solid electrolyte obtained after the reaction was separated, dried under vacuum to obtain a powdery solid electrolyte. For the resulting powder, an XRD spectrum was obtained by the X-ray diffraction measurement, and it was confirmed that the peak of lithium sulfide as the raw material disappeared. The ionic conductivity of this solid electrolyte was measured and found to be $2.2 \times 10^{-4}$ S/cm.

Referential Example 2-5

Li/P Ratio 75/25 Mol

A reaction was conducted in the same manner as in Referential Example 2-4, except that lithium sulfide produced in Production Example 2 was used instead of lithium sulfide produced in Production Example 1. The reaction time was 18 hours. For the powder obtained after the reaction, an XRD spectrum was obtained by an X-ray diffraction measurement. It was confirmed that the peak of lithium sulfide as the raw material disappeared. The ionic conductivity of the resulting solid electrolyte was $3.0 \times 10^{-4}$ S/cm.

Referential Example 2-6

Li/P Ratio 75/25 Mol

A reaction was conducted in the same manner as in Referential Example 2-4, except that lithium sulfide produced in Production Example 3 was used instead of lithium sulfide produced in Production Example 1. The reaction time was 18 hours. For the powder obtained after the reaction, an XRD spectrum was obtained by an X-ray diffraction measurement. It was confirmed that the peak of lithium sulfide as the raw material disappeared. The ionic conductivity of the resulting solid electrolyte was $2.7 \times 10^{-4}$ S/cm.

Comparative Example 2-2

Li/P Ratio 75/25 Mol

A reaction was conducted in the same manner as in Referential Example 2-4, except that lithium sulfide produced in Production Example 4 was used instead of lithium sulfide produced in Production Example 1. The reaction time was 40 hours. For the powder obtained after the reaction, an XRD spectrum was obtained by an X-ray diffraction measurement. The peak of lithium sulfide as the raw material was observed, confirming that the lithium sulfide remained. The ionic conductivity of the resulting solid electrolyte was found to be $1.5 \times 10^{-4}$ S/cm

Comparative Example 2-3

Li/P Ratio 75/25 Mol 41.8 g (75 mol %) of $Li_2S$ in Production Example 1 and 67.5 g (25 mol %) of $P_2S_5$ (manufactured by Sigma-Aldrich Japan K.K.) were weighed in a dry box filled with nitrogen, and incorporated in an alumina-made pot (6.7 L) used in a planetary ball mill together with zirconia-made balls (diameter: 20 mm). The pot was completely sealed in the state where it was filled with a nitrogen gas. This pot was installed in a planetary ball mill machine, and, at the initial stage, milling was conducted at a low speed (rotation: 85 rpm) for several minutes in order to fully mix the raw material at room temperature. Thereafter, the rotational speed was gradually increased, and mechanical milling was conducted at 370 rpm for 120 hours at room temperature. For the powder obtained after the reaction, an XRD spectrum was obtained by an X-ray diffraction measurement. It was confirmed that the peak of lithium sulfide as the raw material disappeared. The ionic conductivity of the resulting solid electrolyte was found to be $3.5 \times 10^{-4}$ S/cm.

Referential Example 2-7

Li/P Ratio 80/20 Mol

The same apparatus as that in Referential Example 2-1 was used. To 42.1 g (75 mol %) of lithium sulfide produced in Production Example 2 and 67.9 g (25 mol %) of $P_2S_5$ (manufactured by Sigma-Aldrich Japan K.K.), 1100 g of dehydrated toluene was added. The mixture was charged in the temperature-retaining tank and the mill.

The contents were circulated by means of a pump at a flow rate of 400 mL/min, and the temperature-retaining tank was heated to 80° C.

By passing through hot water by external circulation in order to hold the temperature of the liquid inside at 70° C., and the mill body was operated at a circumferential speed of 8 m/s. The reaction time was 20 hours. A solid portion of the slurry containing the solid electrolyte obtained after the reaction was separated, dried under vacuum to obtain a powdery solid electrolyte. For the resulting powder, an XRD spectrum was obtained by the X-ray diffraction measurement, and it was confirmed that the peak of lithium sulfide as the raw material disappeared. The ionic conductivity of this solid electrolyte was measured and found to be $2.8 \times 10^{-4}$ S/cm.

The results of the above-mentioned Referential Examples and Comparative Examples are shown in Table 4.

From Table 4, it can be understood that, when Referential Examples and Comparative Examples in which the molar ratio of $Li_2S$ and $P_2S_5$ was the same are compared, it is understood that the reaction time was shorter in Referential Examples. Further, the solid electrolytes obtained in Referential Examples 2-1 to 2-7 and Comparative Examples 2-1 and 2-3 each had a high ionic conductivity.

produced in Production Example 2, 18.8 g (25 mol %) of phosphorous pentasulfide and 300 mL of toluene which had been dehydrated to have a water content of 10 ppm (manufactured by Wako Pure Chemical Industries, Ltd) were charged. The resulting mixture was subjected to a contact reaction while stirring at 150° C. for 72 hours, whereby an amorphous solid electrolyte slurry was obtained.

Subsequently, this slurry solution was subjected to a mechanical milling treatment for 3 hours by using the apparatus shown in FIG. 1, to which a compact milling apparatus was attached. The mechanical milling was conducted at an internal temperature of the reaction tank of 80° C., a circumferential temperature of 12 m/s and a rotational speed of the beads mill of 3880 rpm. After the completion of the mechanical milling, the resulting amorphous solid electrolyte was taken out, and the solid portion was separated and dried in vacuum, whereby an amorphous solid electrolyte was obtained.

The resulting amorphous solid electrolyte was powdery, and had an ionic conductivity of $2.53 \times 10^{-4}$ S/cm. For the resulting powder, an XRD spectrum was obtained by the X-ray diffraction measurement, and it was confirmed that the peak of lithium sulfide as the raw material disappeared. As a result of measurement of the slurry solution of the amorphous solid electrolyte, the average particle diameter was found to be 4.0 μm.

Comparative Example 3-1

An amorphous solid electrolyte was produced in the same manner as in Referential Example 3-1, except that the mechanical milling was not conducted. That is, the amorphous solid electrolyte slurry solution prior to the supply to the compact milling machine was collected. A solid portion was separated, dried in vacuum to obtain an amorphous solid electrolyte.

TABLE 4

|  | Ref. Ex. 2-1 | Ref. Ex. 2-2 | Ref. Ex. 2-3 | Com. Ex. 2-1 | Ref. Ex. 2-4 | Ref. Ex. 2-5 | Ref. Ex. 2-6 | Com. Ex. 2-2 | Com. Ex. 2-3 | Ref. Ex. 2-7 |
|---|---|---|---|---|---|---|---|---|---|---|
| $Li_2S:P_2S_5$ (Molar ratio) | 70:30 | 70:30 | 70:30 | 70:30 | 75:25 | 75:25 | 75:25 | 75:25 | 75:25 | 80:20 |
| $Li_2S$ used as raw material | Pro. Ex. 1 | Pro. Ex. 2 | Pro. Ex. 3 | Pro. Ex. 4 | Pro. Ex. 1 | Pro. Ex. 2 | Pro. Ex. 3 | Pro. Ex. 4 | Pro. Ex. 1 | Pro. Ex. 2 |
| Specific surface area of $Li_2S$ [m²/g] | 14.8 | 43.2 | 20.0 | 0.8 | 14.8 | 43.2 | 20 | 0.8 | 14.8 | 43.2 |
| Pore volume of $Li_2S$ [ml/g] | 0.15 | 0.68 | 0.17 | 0.0001 | 0.15 | 0.68 | 0.17 | 0.0001 | 0.15 | 0.68 |
| Temperature of temperature-retaining apparatus [° C.] | 80 | 80 | 80 | 80 | 80 | 80 | 80 | 80 | — | 80 |
| Circulation speed [mL/min] | 400 | 400 | 400 | 400 | 400 | 400 | 400 | 400 | — | 400 |
| Temperature of mill [° C.] | 70 | 70 | 70 | 70 | 70 | 70 | 70 | 70 | Room temperature | 70 |
| Circumferential speed (mill) [m/s] | 8 | 8 | 8 | 8 | 8 | 8 | 8 | 8 | — | 8 |
| Reaction time [h] | 10 | 6 | 6 | 12 | 40 | 18 | 18 | 40 | 120 | 20 |
| Ionic conductivity [S/cm] | $1.6 \times 10^{-4}$ | $1.7 \times 10^{-4}$ | $1.6 \times 10^{-4}$ | $1.2 \times 10^{-4}$ | $2.2 \times 10^{-4}$ | $3.0 \times 10^{-4}$ | $2.7 \times 10^{-4}$ | $1.5 \times 10^{-4}$ | $3.5 \times 10^{-4}$ | $2.8 \times 10^{-4}$ |
| Ionic conductivity after treating solid electrolyte at 300° C. for 2 h [S/cm] | $2.0 \times 10^{-3}$ | $2.1 \times 10^{-3}$ | $1.9 \times 10^{-3}$ | $1.8 \times 10^{-3}$ | — | — | — | — | — | — |

Examples of the Third Invention

Referential Example 3-1

Preparation of Electrolyte Glass

A 0.5 L-autoclave provided with a stirrer was replaced with nitrogen. In this autoclave, 12 g (75 mol %) of pulverized $Li_2S$ In an XRD spectrum of the resulting amorphous solid electrolyte, a peak derived from lithium sulfide was observed. The ionic conductivity was found to be $1.88 \times 10^{-4}$ S/cm.

Comparative Example 3-2

A 0.5 L-autoclave provided with a stirrer was replaced with nitrogen. In this autoclave, 12 g (75 mol %) of pulverized $Li_2S$ produced in Production Example 2, 18.8 g (25 mol %) of phosphorous pentasulfide and 300 mL of toluene which had been dehydrated to have a water content of 10 ppm (manufactured by Wako Pure Chemical Industries, Ltd.) were charged. The resulting mixture was subjected to a contact reaction while stirring at 150° C. for 168 hours, whereby an amorphous solid electrolyte slurry was obtained.

A solid portion of the resulting amorphous solid electrolyte was separated, dried in vacuum to obtain an amorphous solid electrolyte.

The resulting amorphous solid electrolyte was powdery, and had an ionic conductivity of $1.22 \times 10^{-4}$ S/cm. For the resulting powder, an XRD spectrum was obtained by the X-ray diffraction measurement, and it was confirmed that the peak of lithium sulfide as the raw material remained. As a result of measurement of the slurry solution of the amorphous solid electrolyte, the average particle diameter was found to be 4.0 μm.

Referential Example 3-2

The amorphous solid electrolyte slurry solution prior to the mechanical milling treatment of Referential Example 3-1 was dried at 150° C. for 2 hours, whereby amorphous solid electrolyte powder was obtained. 1.0 g of the resulting powder was pulverized at 370 rpm for 3 hours by means of a planetary ball mill, thereby to obtain amorphous solid electrolyte powder.

The amorhous solid electrolyte powder after the pulverization was $2.69 \times 10^{-4}$ S/cm. For the resulting powder, an XRD spectrum was obtained by the X-ray diffraction measurement, and it was confirmed that the peak derived from lithium sulfide disappeared.

Referential Example 3-3

Lithium sulfide produced in Production Example 1 was used instead of lithium sulfide produced in Production Example 2, and charged in an autoclave such that the amount ratio of lithium sulfide and phosphorous pentasulfide became 70:30 (mol:mol). Thereafter, an amorphous solid electrolyte was produced in the same manner as in Referential Example 3-1, except that the contact reaction time was changed from 72 hours to 24 hours. This electrolyte slurry solution was subjected to a mechanical milling treatment for 3 hours by using a compact milling apparatus as in Referential Example 3-1. For the resulting amorphous solid electrolyte, an XRD spectrum was obtained by the X-ray diffraction measurement, and it was confirmed that the peak derived from lithium sulfide disappeared. The ionic conductivity of this amorphous solid electrolyte was $1.02 \times 10^{-4}$ S/cm.

The resulting amorphous solid electrolyte was subjected to a heat treatment at 300° C. for 2 hours, thereby to obtain glass ceramic electrolyte. The resulting glass ceramic electrolyte has an ionic conductivity of $1.80 \times 10^{-3}$ S/cm.

Comparative Example 3-3

An amorphous solid electrolyte was produced in the same manner as in Referential Example 3-3, except that the mechanical milling treatment was not conducted. Specifically, the amorphous solid electrolyte slurry solution prior to the supply to the compact milling apparatus was collected, and a solid portion was separated, dried under vacuum to obtain an amorphous solid electrolyte. For the resulting amorphous solid electrolyte, an XRD spectrum was obtained by the X-ray diffraction measurement, and it was confirmed that the peak derived from lithium sulfide as the raw material was observed. The ionic conductivity of this amorphous solid electrolyte was $5.57 \times 10^{-5}$ S/cm.

The resulting amorphous solid electrolyte was subjected to a heat treatment at 300° C. for 2 hours, thereby to obtain glass ceramic electrolyte. The resulting glass ceramic electrolyte has an ionic conductivity of $1.07 \times 10^{-3}$ S/cm.

Referential Example 3-4

Lithium sulfide produced in Production Example 1 was pulverized in a nitrogen atmosphere by means of a jet mil apparatus (manufactured by Aishin Nano Technologies, Co., Ltd.). The collected lithium sulfide had a specific surface area of 20.0 m²/g and a particle size of 2.1 μm.

An amorphous solid electrolyte was obtained in the same manner as in Referential Example 3-1, except that lithium sulfide pulverized by the jet mill apparatus was used instead of lithium sulfide produced in Production Example 2.

The resulting amorphous solid electrolyte was powdery, and had an ionic conductivity of $2.22 \times 10^{-4}$ S/cm. For the resulting powder, an XRD spectrum was obtained by the X-ray diffraction measurement, and it was confirmed that the peak derived from lithium sulfide disappeared.

Referential Example 3-5

The amorphous solid electrolyte slurry solution prior to the mechanical milling treatment of Referential Example 3-4 was dried at 150° C. for 2 hours, whereby amorphous solid electrolyte powder was obtained. 1.0 g of the resulting powder was pulverized at 370 rpm for 3 hours by means of a planetary ball mill, thereby to obtain amorphous solid electrolyte powder was obtained.

The amorhous solid electrolyte powder after the pulverization was $1.62 \times 10^{-4}$ S/cm. For the resulting powder, an XRD spectrum was obtained by the X-ray diffraction measurement, and it was confirmed that the peak derived from lithium sulfide disappeared.

Comparative Example 3-4

An amorphous solid electrolyte was produced in the same manner as in Referential Example 3-4, except that the mechanical milling treatment was not conducted. Specifically, the amorphous solid electrolyte slurry solution prior to the supply to the compact milling apparatus was collected, and a solid portion was separated, dried under vacuum to obtain an amorphous solid electrolyte. For the resulting amorphous solid electrolyte, an XRD spectrum was obtained by the X-ray diffraction measurement, and it was confirmed that the peak derived from lithium sulfide as the raw material was partially observed. The ionic conductivity of this amorphous solid electrolyte was $1.15 \times 10^{-4}$ S/cm.

INDUSTRIAL APPLICABILITY

The glass according to the first invention can be preferably used as an electrolyte or an electrode material of an all-solid battery.

The production methods according to the second and third inventions are preferable for the production of an ionic conductive substance. The ionic conductive substance of the invention can be used as the raw material of a secondary battery or the like.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification and the Japanese application specification claiming priority under the Paris Convention are incorporated herein by reference in its entirety.

The invention claimed is:

1. Glass particles, comprising Li, P and S, wherein when a Raman spectrum of the glass particles is measured five times or more and a peak at 330 to 450 cm$^{-1}$ in the Raman spectrum is separated into peaks of components by waveform separation,
a standard deviation of the area ratio of each of the peaks of the components is 3.0 or less,
an area of the peak of $PS_4^{3-}$ component obtained by the waveform separation is 10 to 95% of the total area,
an area of $P_2S_7^{4-}$ component obtained by the waveform separation is 5 to 45% of the total area, and
the area of the peak of $PS_4^{3-}$ component is larger than the area of the peak of $P_2S_7^{4-}$ component.

2. The glass particles according to claim 1, wherein:
the standard deviation is 2.7 or less,
the area of the peak of $PS_4^{3-}$ component is 70 to 90% of the total area; and
the area of $P_2S_7^{4-}$ component is 5 to 20% of the total area.

3. The glass particles according to claim 1, having an average particle diameter of 10 μm or less.

4. The glass particles according to claim 1, which are produced from lithium sulfide having a specific surface area of 0.1 m$^2$/g or more and a pore volume of 0.02 ml/g or more.

5. The glass particles according to claim 1, wherein the standard deviation is 2.0 or less.

6. The glass particles according to claim 1, wherein the area of the peak of $PS_4^{3-}$ component is 70 to 90% of the total area.

7. The glass particles according to claim 1, wherein the area of the peak of $P_2S_7^{4-}$ component is 5 to 20% of the total area.

8. The glass particles according to claim 1, having an average particle diameter of 0.10 μm or more and 8 μm or less.

9. The glass particles according to claim 2, having an average particle diameter of 10 μm or less.

10. The glass particles according to claim 2, having an average particle diameter of 0.10 μm or more and 8 μm or less.

11. The glass particles according to claim 4, wherein the specific surface area is 1.0 m$^2$/g or more.

12. The glass particles according to claim 4, wherein the pore volume is 0.05 ml/g or more.

13. The glass particles according to claim 1, which are produced from $Li_2S$ and $P_2S_5$.

14. The glass particles according to claim 13, wherein $Li_2S:P_2S_5$ in the amount ratio is 72 to 82 mol %:28 to 18 mol %.

15. The glass particles according to claim 1, wherein an amount of an organic solvent remained in the glass particles is 5.0 wt % or less.

16. The glass particles according to claim 1, wherein an amount of an organic solvent remained in the glass particles is 3.0 wt % or less.

* * * * *